US010232305B2

(12) United States Patent
Gebald et al.

(10) Patent No.: US 10,232,305 B2
(45) Date of Patent: Mar. 19, 2019

(54) DIRECT AIR CAPTURE DEVICE

(71) Applicant: CLIMEWORKS AG, Zürich (CH)

(72) Inventors: Christoph Gebald, Zürich (CH);
Werner Meier, Spardorf (DE); Nicolas Repond, Zürich (CH); Tobias Ruesch, Zürich (CH); Jan André Wurzbacher, Zürich (CH)

(73) Assignee: CLIMEWORKS AG, Zurich (CH)

( * ) Notice: Subject to any disclaimer, the term of this patent is extended or adjusted under 35 U.S.C. 154(b) by 90 days.

(21) Appl. No.: 15/315,930

(22) PCT Filed: May 28, 2015

(86) PCT No.: PCT/EP2015/061807
§ 371 (c)(1),
(2) Date: Dec. 2, 2016

(87) PCT Pub. No.: WO2015/185434
PCT Pub. Date: Dec. 10, 2015

(65) Prior Publication Data
US 2017/0106330 A1 Apr. 20, 2017

(30) Foreign Application Priority Data
Jun. 3, 2014 (EP) .................... 14170936

(51) Int. Cl.
B01D 53/04 (2006.01)
B01D 53/047 (2006.01)
(Continued)

(52) U.S. Cl.
CPC ..... B01D 53/0476 (2013.01); B01D 53/0423 (2013.01); B01J 3/006 (2013.01);
(Continued)

(58) Field of Classification Search
CPC ............ B01D 53/0423; B01D 53/0476; B01D 2257/504; B01J 3/006; F16K 15/03
(Continued)

(56) References Cited

U.S. PATENT DOCUMENTS 687,186 A 11/1901 Alz
2,414,642 A * 1/1947 Wright .................... F26B 9/066
34/225
(Continued)

FOREIGN PATENT DOCUMENTS

EP 0 820 798 A 1/1998
EP 0 864 819 A2 9/1998
(Continued)

OTHER PUBLICATIONS

International Search Report for PCT/EP2015/061807 dated Aug. 20, 2015.

Primary Examiner — Frank M Lawrence, Jr.
(74) Attorney, Agent, or Firm — Sughrue Mion, PLLC

(57) ABSTRACT

A vacuum chamber (2) for a direct air capture process and enclosing an interior space (13) for housing an adsorber structure (1) is given comprising a contiguous circumferential wall structure (115) along an axis (15), which circumferential wall structure (115) in an axial direction is closed by an inlet and an outlet axial wall (116), respectively. Both axial walls (116) comprise at least one closing stainless steel lid (6) allowing for, in an open position, gas to be circulated through the vacuum chamber (2) for passing an adsorber structure (1), and, in a closed position, to close the interior space (13) and to allow evacuation of the interior space (13) down to pressure of 500 $mbar_{abs}$ or less.

34 Claims, 11 Drawing Sheets

(51) Int. Cl.
 *B01J 3/00* (2006.01)
 *F16K 1/24* (2006.01)
 *F16K 15/03* (2006.01)

(52) U.S. Cl.
 CPC .............. *F16K 1/24* (2013.01); *F16K 15/03* (2013.01); *B01D 2257/504* (2013.01); *Y02C 10/08* (2013.01)

(58) Field of Classification Search
 USPC ........ 95/96, 106, 139, 148; 96/108; 423/230
 See application file for complete search history.

(56) References Cited

U.S. PATENT DOCUMENTS

| | | | |
|---|---|---|---|
| 2,612,338 A | 9/1952 | Flosdorf et al. | |
| 3,857,545 A | 12/1974 | Santi | |
| 4,207,084 A * | 6/1980 | Gardner | B01D 53/0407 96/113 |
| 4,333,752 A * | 6/1982 | Thies | B01D 53/0415 206/0.5 |
| 7,191,598 B2 | 3/2007 | Coleman et al. | |
| 8,034,164 B2 | 10/2011 | Lomax, Jr. et al. | |
| 8,163,066 B2 | 4/2012 | Eisenberger | |
| 2009/0095154 A1 * | 4/2009 | Barone | B01D 53/0476 95/96 |
| 2009/0120288 A1 | 5/2009 | Lackner et al. | |
| 2011/0296872 A1 | 12/2011 | Eisenberger | |
| 2012/0174778 A1 | 7/2012 | Eisenberger | |
| 2012/0174779 A1 | 7/2012 | Eisenberger | |
| 2017/0113176 A1 * | 4/2017 | Fowler | B01D 53/0446 |

FOREIGN PATENT DOCUMENTS

| | | |
|---|---|---|
| FR | 1 148 736 A | 12/1957 |
| FR | 1 246 256 A | 11/1960 |
| FR | 1 595 355 A | 6/1970 |
| FR | 2 986 440 A1 | 8/2013 |
| GB | 621 195 A | 4/1949 |
| WO | 2010/022339 A2 | 2/2010 |
| WO | 2010/091831 A1 | 8/2010 |
| WO | 2012/168346 A1 | 12/2012 |
| WO | 2014/170184 A1 | 10/2014 |

* cited by examiner

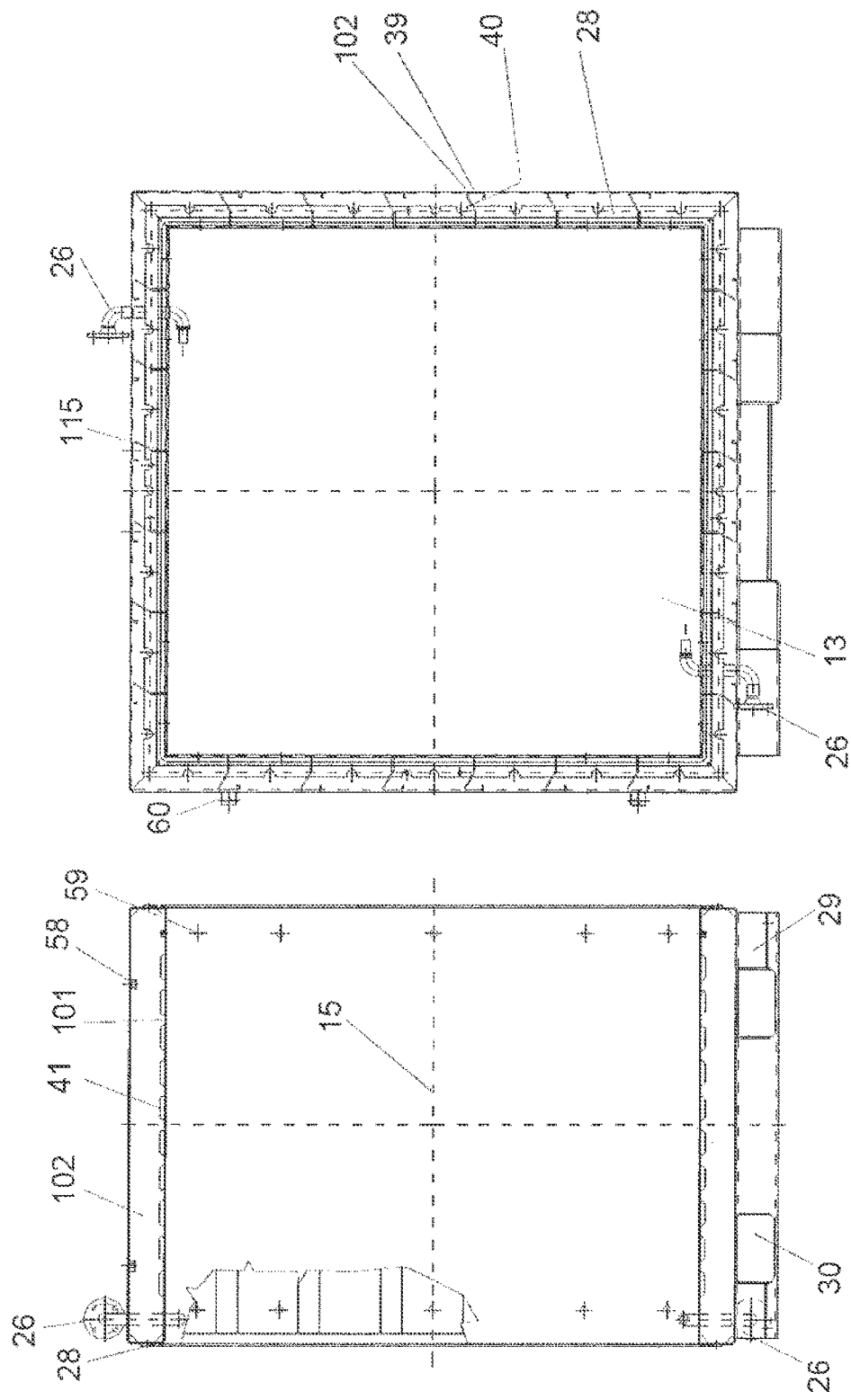

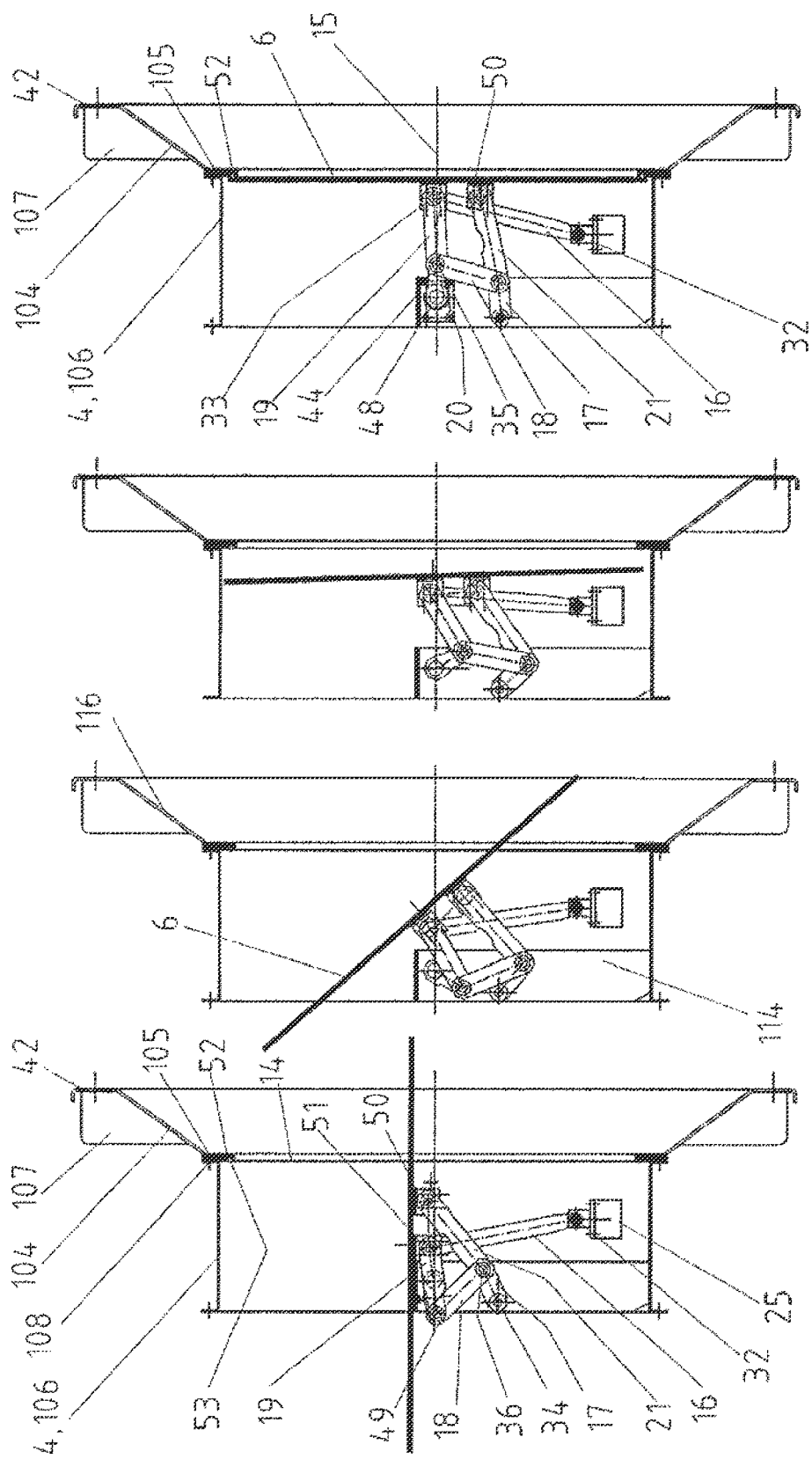

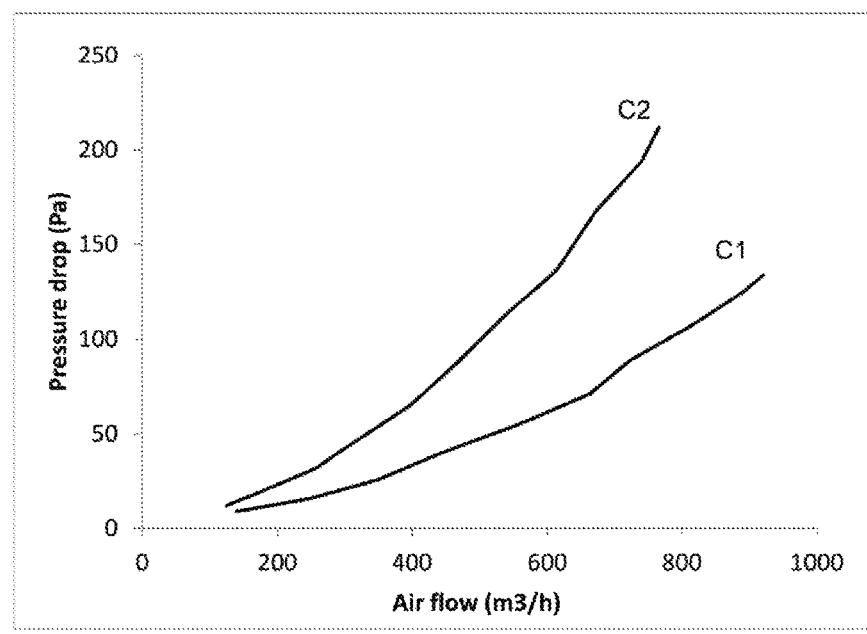
FIG. 6
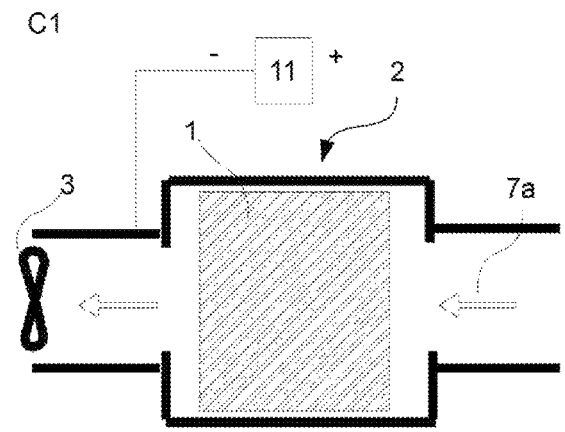
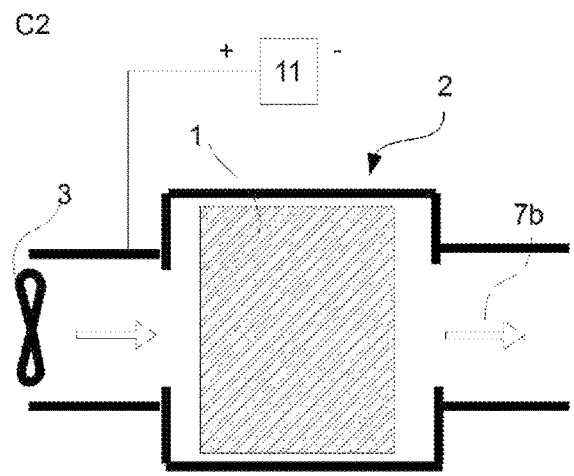
FIG. 7

DIRECT AIR CAPTURE DEVICE

CROSS REFERENCE TO RELATED APPLICATIONS

This application is a National Stage of International Application No. PCT/EP2015/061807 filed May 28, 2015, claiming priority based on European Patent Application No. 14 170 936.0 filed Jun. 3, 2014, the contents of all of which are incorporated herein by reference in their entirety.

TECHNICAL FIELD

The present invention relates to new direct air capture devices, on the one hand focusing on a particularly robust and high throughput lid construction for a vacuum chamber, and on the other hand focusing on a particularly stable and thermally optimized large volume vacuum chamber for a direct air capture unit.

PRIOR ART

Gas separation by adsorption has many different applications in industry, for example removing a specific component from a gas stream, where the desired product can either be the component removed from the stream, the remaining depleted stream, or both. Thereby both, trace components as well as major components of the gas stream can be targeted by the adsorption process. One important application is capturing carbon dioxide (CO2) from gas streams, e.g., from flue gases, exhaust gases, industrial waste gases, or atmospheric air. Capturing CO2 directly from the atmosphere, referred to as direct air capture (DAC), is one of several means of mitigating anthropogenic greenhouse gas emissions and has attractive economic perspectives as a non-fossil, location-independent CO2 source for the commodity market and for the production of synthetic fuels. The specific advantages of CO2 capture from the atmosphere include: (i) DAC can address the emissions of distributed sources (e.g. cars, planes), which account for a large portion of the worldwide greenhouse gas emissions and can currently not be captured at the site of emission in an economically feasible way; (ii) DAC can address emissions from the past and can therefore create truly negative emissions; (iii) DAC systems do not need to be attached to the source of emission but are rather location independent and can for example be located at the site of further CO2 processing; and (iv) if CO2 that was captured from the atmosphere is used for the production of synthetic hydrocarbon fuels from renewable energy sources, truly non-fossil fuels for the transportation sector can be obtained, that create no or very few net CO2 emissions to the atmosphere.

Several DAC methods have recently been developed based on various technological approaches. For example, U.S. Pat. No. 8,163,066 B2 discloses carbon dioxide capture/regeneration structures and techniques; US 2009/0120288 A1 discloses a method for removal of carbon dioxide from air; US 2012/0174778 discloses a carbon dioxide capture/regeneration method using a vertical elevator; and WO2010022339 discloses a carbon dioxide capture method and facility.

One particular approach is based on a cyclic adsorption/desorption process on solid, chemically functionalized sorbent materials. For example, in WO2010091831 a structure based on amine functionalized adsorbents materials together with a cyclic adsorption/desorption process using this material for the extraction of carbon dioxide from ambient atmospheric air is disclosed.

Therein, the adsorption process takes place at ambient atmospheric conditions at which air is streamed through the sorbent material and a portion of the CO2 contained in the air is chemically bound at the surface of amine functionalized adsorbents. During the subsequent desorption, the material is heated and the partial pressure of carbon dioxide surrounding the sorbent is reduced by applying a vacuum or exposing the sorbent to a purge gas flow. Thereby, the previously captured carbon dioxide is removed from the sorbent material and obtained in a concentrated form.

All DAC approaches have one major challenge in common which are the very large air volumes that have to be passed through any capture system in order to extract a certain amount of CO2 from the air. The reason for this is the very low concentration of CO2 in the atmospheric air, currently between 390 and 400 ppm, i.e., roughly 0.04%. Thus, in order to extract one metric ton of CO2 from the atmosphere, at least about 1'400'000 cubic meters of air have to be passed through the capture system. This in turn means that economically feasible capture systems must have a very low pressure drop on the air flow passing through them. Otherwise the energy requirements for air pumping will render the system uneconomical.

In WO2012168346A1, a sorbent material based on an amine functionalized cellulose adsorbent is disclosed, which can be used for the above described process. In PCT/EP2014/057185 a low pressure drop structure composed of particle adsorbent beds is disclosed which can be used for the above described process.

Certain methods of solid sorbent material regeneration in DAC applications, such as temperature-vacuum swing processes (see e.g. WO2010091831) involve batch wise adsorption-desorption processes in which a structure containing sorbent material needs to be alternately exposed to a high-volume flow air stream (adsorption/contacting) and to desorption conditions characterized by elevated temperatures and vacuum pressures down to 10 $mbar_{abs}$. This requires structures which on the one hand allow the sorbent material to be exposed to a high-volume flow of atmospheric air to adsorb CO2 and can on the other hand withstand vacuum pressures down to 10 $mbar_{abs}$, sorbent material temperatures up to 130° C. and mixtures of CO2, air, and water as vapor and liquid. Due to the batch wise operation of typical DAC adsorption-desorption process, these structures will experience periodic thermal and mechanical stresses with cycling times on the order of hours.

Typically devices for gas separation processes comprising pressure and/or vacuum swings are, for constructional and stability reasons, long, narrow thick walled columns with small inlet and outlet openings, where "small openings" mean openings that are significantly smaller than the cross section of the column. The columns are typically operated as packed beds with the appropriate flow distributor plates. Prior art devices used for pressure and/or vacuum swing based gas separation are typically operated with very fast cycle times on the order of seconds to a few minutes, during which their thermal mass or thermal inertia does not play a major role. Further, the devices are typically applied to high pressure flows with high adsorbate concentrations and can thus use openings and flow conduits significantly smaller than their cross section as pressure drops are relatively small.

The following documents illustrate this known design applied to typical vacuum pressure swing adsorption columns:

U.S. Pat. No. 6,878,186 refers to a method and apparatus to pure vacuum swing desorption in a classical adsorption column, and to drawings of process and apparatus of classical adsorption column including some internal details.

EP 0820798 discloses a radial bed adsorber vessel for vacuum/pressure swing adsorption, wherein the flow passes through a double wall in an annular manifold and then radially through the bed before being discharged along an axially located exhaust port. Main point is the description of flow structures and geometry inside an adsorption column.

U.S. Pat. No. 8,034,164 relates to multiple pressure swing adsorption columns operating in parallel and discloses details to column construction and assembly, details to control of flows and cycle optimization.

Gas flow control over large cross sections is typically achieved through actuated lids, which are sometimes also designated as flaps or dampers. They are typically built into ducting in usage for ventilation in power plants. They are typically not used for pressure containers or chambers. The typical maximum pressure difference across such lids in ventilation applications is about 0.2 bar. On the other hand, conventional process valves are designed for sealing pressure differences on the order of several bar up to several hundred bar in both directions. This necessitates a very solid construction and strong drives and actuators as the pressure difference cannot be used as a supporting force for sealing in both directions. Consequently, very significant material thicknesses make these process valves relatively costly. Certain devices use mechanical joints with drives as described in the following prior art documents:

EP 0 864 819 relating to a rotating flap valve built into ducting for use in ventilation applications. U.S. Pat. No. 7,191,598 relating to a bypass/redirection damper (valve) for gas turbine applications. U.S. Pat. No. 5,697,596 relating to a flap valve for square ducting with mechanical joint actuator.

A number of vacuum chamber designs have focused on chambers of square cross sections. Such devices are known in applications—among other—to freeze dryers, fuels cells (e.g. used in submarines) and vapor deposition chambers. Such devices are either manually loaded or unloaded or for continuous operation, respectively, under vacuum.

Some prior art systems for contacting and regeneration of solid sorbent material in DAC applications involve transferring the sorbent material and adsorber structure between a region of air flow for adsorption and a chamber for regeneration as illustrated in US 2012/0174779 and US2011/0296872. A device for adsorption/desorption structure is described wherein the adsorber structure is not moved, which offers at least the following advantages. Firstly, certain adsorber structures suitable for DAC usage rely on gas seals to the containing walls to prevent bypass flows. The robustness of these seals is significantly improved if these structures are not moved. Secondly, for applications involving vacuum in the desorption stage, a movable adsorber structure requires automatically actuated doors which are at least the size of the adsorber structure limiting hereby either the size of possible adsorber structures or making the door construction very challenging. Thirdly, in general a DAC system performs several 10'000 cycles over its lifetime so that every reduction in moving parts contributes to improved reliability and consequently reduced maintenance cost.

FR2986440 relates to an adsorption element for the purification or separation of a fluid, comprising M parallel modules (3, 4, 5), wherein M>2, each module being spaced apart from the neighboring module by a volume and comprising at least one parallel passage contactor housed in a classical adsorption column. The adsorber is characterized in that the ratio of the volume of adsorbent included in the M modules to the free volume accessible to the fluid is greater than 0.75.

Documents GB 621195, FR1148736, U.S. Pat. No. 3,857,545, FR1246256, U.S. Pat. No. 2,612,338 as well as FR 1595355 disclose vacuum closure elements, however in the context of tubing and not in the context of carbon dioxide capture devices.

SUMMARY OF THE INVENTION

The object of the present invention is therefore twofold. On the one hand it is an object of the present invention to make available a new vacuum chamber for a direct air capture process device with an as low as possible thermal mass but at the same time with an as high as possible mechanical stability to allow for the application of low vacuum pressures. On the other hand and also regarded as an invention separate of the above aspect, it is an object of the present invention to make available a new closure mechanism for a vacuum chamber suitable for a direct air capture process, which allows for a large flow cross-section to be available at the open position, but which at the same time allows a tight and robust sealing also under difficult environmental conditions again with a high mechanical stability at low thermal mass.

According to the first aspect of the present invention vacuum chamber, which does not necessarily have to be a vacuum chamber as outlined below with the ribbing elements, for a direct air capture process and enclosing an interior space for housing an adsorber structure is proposed. It comprises a contiguous circumferential circular, rectangular or square wall structure along or rather around an axis, which circumferential wall structure in an axial direction is closed by an inlet and an outlet axial wall, respectively. Both axial walls comprise at least one closing lid allowing for, in an open position, gas to be circulated through the vacuum chamber for contacting the adsorber structure, and in a closed position, to close the interior space and to allow evacuation of the interior space down to pressure of 500 $mbar_{abs}$ or even below that.

If in the context of the present invention it is mentioned that the structure is provided such as to allow evacuation of the interior space down to a pressure of 500 $mbar_{abs}$ and less, this is intending to mean that the structure, if standing in an environment of ambient atmospheric pressure (around 1 atm, i.e. around 101,325 kPa), is able to withstand an internal pressure of 500 $mbar_{abs}$, or pressures below that, preferably being able to withstand an internal pressure of 10 $mbar_{abs}$ or less. So the structure is provided to be able to withstand, e.g. pressures of e.g. in the range of 5-200 $mbar_{abs}$ or even below that, e.g. 10 $mbar_{abs}$ or 5 $mbar_{abs}$ or of $10^-8$ $mbar_{abs}$. So the structure is able to withstand pressure differences between the outside and the interior space in the range of 0.95 bar, or 0.99 bar, or even 0.9999 bar, so close to or even around 1 bar.

According to the first aspect of this invention, at least one, preferably both of said axial walls are provided with a circular opening with a contact ring, which circular opening can be closed in a gas tight manner by a single circular lid plate having a diameter just somewhat larger than said circular opening and in a closed state contacting said contact ring in an axial direction. Said contact ring is provided, on its axial surface facing said lid plate in closed position, with a full perimeter circular elastic sealing element.

Surprisingly such a structure is extremely efficient and mechanically stable. As a matter of fact, under the load of the actuation mechanism in the closed position the circular lid can slightly deform inwardly, such that imperfections of the sealing (distortions of the contact ring and/or of the lid, contaminations of the sealing portion such as dust, insufficient sealing ring quality) are automatically compensated.

According to a first preferred embodiment of this second aspect, said contact ring is provided with a full perimeter circular groove which is outwardly (seen with respect to the interior space) open and facing the lid, and wherein preferably in the circular groove there is located an O-ring of an elastic material. This O-ring preferably has a cord diameter in the range of 2-15 mm, preferably in the range of 3-6 mm.

The lid is a circular, preferably stainless steel or steel plate with a diameter in the range of 0.4-1.5 m or 0.5-1.5 m, preferably 0.75-1.25 m, and with a thickness in the range of 4-12 mm, preferably in the range of 6-10 mm, and which is preferably free from any stiffening element apart from attachment elements for attaching the mechanism for actuating and controlling the lid.

Generally speaking when in the following talking about stainless steel plates or other stainless steel elements, this shall mean steel element, preferably stainless steel element. So where mention is made of a stainless steel plates this shall also include steel plates. The steel plates or elements may e.g. further preferably be surface treated or coated so as to avoid corrosion, thereby avoiding the need of having to use stainless steel.

To allow for the deformation of the lid plate preferably the diameter of the lid is in the range of 90-200, or 90-160, more preferably in the range of 105-145 times the thickness of the lid plate.

The lid, according to a further preferred embodiment, is a flap valve actuated with an actuation mechanism located exclusively at the face of the lid opposite to the interior space, wherein in the open position the lid is brought into a position where its plane is aligned and essentially coinciding with said axis, and wherein further preferably the actuation mechanism is a double-lever based actuation mechanism.

The actuation mechanism preferably comprises a drive lever, e.g. driven via a driveshaft at its first end about a first axis by a motor, attached at its second end forming a second axis to a first end of a front lever. The second end of said front lever is tiltably, around a tilt axis of the lid, attached to a portion of the lid located essentially on or near said axis. Preferably in the position in which the lid is closed the drive lever and the front lever are aligned essentially along a straight line parallel or essentially collinear with said axis, which allows for taking over part of the force acting on the lid under vacuum conditions.

According to a further preferred embodiment, for controlling the tilting motion upon opening, there is provided a control lever which with a first end is rotatable about a spatially fixed third axis and with a second end is rotatably attached to a first end of a coupling lever as well as to a first end of a tilt lever. The second end of said tilt lever is tiltably attached to the lid at a position offset from the attachment of the front lever around a fourth axis. The second end of said coupling lever on the other hand is, with its second end, tiltably attached and rotatable around said second axis.

According to a preferred embodiment of this actuation mechanism the first, second, third and fourth axes are all arranged parallel and all of them orthogonal to the axis of the vacuum chamber.

Further preferably there can be provided a pair of guide levers, offset towards both sides with respect to the arrangement of said central arrangement drive lever, front lever, coupling lever, control lever and tilt lever, wherein said guide levers are rotatable around a spatially fixed lower rotation axis with their first end and with their second end are rotatably attached around an upper rotation axis to the lid, wherein the upper rotation axis and the tilt axis are arranged collinearly.

According to the second aspect of the present invention, a vacuum chamber for a direct air capture process and enclosing an interior space for housing an adsorber structure is proposed, which comprises a contiguous circumferential wall structure arranged along or rather around an axis. This vacuum chamber can be provided with a lid construction as given above. This circumferential wall structure in an axial direction is closed by an inlet and an outlet axial wall, respectively, both axial walls comprising at least one closing lid allowing for, in an open position, gas to be circulated through the vacuum chamber for passing an adsorber structure or another structure located in the interior space, and, in a closed position, to close the interior space and to allow evacuation of the interior space, preferably down to pressure of 500 $mbar_{abs}$ or even below that. The circumferential wall structure is formed by four adjacent steel plates or preferably stainless steel plates forming a rectangular or square cross-section boxlike structure.

As an alternative the circumferential wall structure is formed by one or several curved steel plates or preferably stainless steel plates forming a circular cross-section cylindrical channel like structure.

Thus according to another aspect of the invention, the circumferential wall structure has a circular cross-section and is preferably formed by one single or a sequence of curved steel plates, preferably stainless steel plates, with a thickness in the range of 2-8 mm, with an axial length in the range of 0.7-1.8 m.

According to this aspect of the invention, the axial extension, or rather the axial length of the stainless steel plates of the circumferential wall structure is in the range of 0.6-2.0 m or 0.7-1.8 m, and/or the radial extension or rather the width of the stainless steel plates of the circumferential wall structure is in the range of 0.6-1.8 m. Furthermore the stainless steel plates, on their sides facing away from the interior space, are each provided with a plurality of axially extending ribbing elements, which ribbing elements are attached to the respective stainless steel plate section- and/or point wise. The plurality of attachment sections can be separated by a plurality of recesses of the ribbing elements, where there is no contact between the ribbing elements and the respective stainless steel plate.

According to a preferred embodiment, the radial extension of the circumferential wall structure, i.e. the width of each of the stainless steel plates, is in the range of 1.2-1.6 m.

According to another preferred embodiment, the axial extension, i.e. the axial length of the stainless steel plates, is in the range of 1.0-2.0 m, preferably 1.4-1.6 m.

According to yet another preferred embodiment, the cross sectional area of the circumferential wall structure is square. The circumferential walls are formed by four planar stainless steel plates.

Also slightly curved, preferably somewhat outwardly bent plates having a maximum deflection of at most 100 mm out of the plane, normally at an axial and/or radial extension of 1.5 m, are still considered to be planar stainless steel plates according to the present invention. In the same sense, the lids are still considered to be planar stainless steel plates, even if these plates are slightly curved, preferably somewhat outwardly bent having a maximum deflection of at most 80 mm out of the plane at a diameter of 1 m.

Preferentially, the joints between the respective stainless steel plates are welded seams. Typically the thickness of the stainless steel plates of the circumferential wall structure is in the range of 2-8 mm, preferably in the range of 3-5 mm.

As a matter of fact, surprisingly it was found that rather small thickness metal plates can be used provided the proposed ribbing elements are used, so this rather slim rectangular structure surprisingly allows for low vacuum pressures and at the same time has the advantage of having a low thermal mass. For the case that the plates are slightly curved as described above the desired stiffness can be achieved with less ribbing elements.

The stainless steel plates, at their axial edges, can be provided with attachment flanges extending radially outwardly, and the ribbing elements can be, with their axial ends, attached to these attachment flanges, preferably by welding seams. This significantly increases the stability in particular under vacuum load. Indeed the structure is tailored not to have a completely stiff characteristic, but it is allowed to slightly contract under vacuum conditions. The stability in this respect can be increased by attaching the ribbing elements also to these flanges.

According to yet another preferred embodiment, every 15-35 cm, preferably every 20-30 cm, measured in a circumferential direction, one ribbing element is arranged on the respective stainless steel plate. A most preferred variant is characterized in that every 220-240 mm a ribbing element is arranged on the respective stainless steel plate. Preferentially the ribbing elements on a respective stainless steel plate are essentially equally distributed along the circumference.

Yet another preferred embodiment is characterized in that each ribbing element is provided as a pultruded, bent or welded T-profile, L-profile, box profile or a 7-profile comprising a stiffening section of the attached to the respective stainless steel plate via said attachment sections at one lateral edge and at the opposite lateral edge attached to or adjoining to a transverse section. Generally speaking, preferably the radial height of the stiffening section in a radial direction is in the range of 4-15 cm, preferably in the range of 5-7 cm, and preferably the circumferential width of the transverse section is in the range of 2-10 cm, preferably in the range of 3-7 cm.

Yet another preferred embodiment is characterized in that the ribbing elements are metal, preferably stainless steel profiles with a wall thickness in the range of 1.5-7 mm, preferably in the range of 2-5 mm.

The axial extension of the recesses can be in the range of 30-100 mm, preferably in the range of 50-80 mm.

The axial extension of the attachment sections can be in the range of 10-50 mm, preferably in the range of 20-40 mm, wherein preferably this length is equal to the weld seam length of the attachment to the respective stainless steel plate.

According to another preferred embodiment, at least one of the axial walls is provided as a dome structure, preferably with an axial cylindrical tubular extension forming an inlet or outlet channel, respectively, wherein at the circular interface between the dome structure and the cylindrical tubular extension the respective lid seals, preferably at a contact ring, the vacuum chamber.

The dome structure may comprise flat sections at straight edges of the respective stainless steel plates, wherein preferably in the region of the flat sections there is further provided one or a multitude of exterior stiffening ribs attached to the flat sections and to a flange section of the dome structure for attachment to the circumferential wall structure, and wherein further the dome structure comprises curved sections converging towards the edges formed between adjacent stainless steel plates, wherein preferably said curved sections are formed by deep drawing or by a plurality of individual, essentially wedge-shaped flat sections sequentially tilted with respect to each other.

The dome structure may in the alternative also be constructed of four essentially planar sections which are bent to form ramps and welded together to form a truncated trapezoidal cone. The outermost faces of this dome structure may simultaneously form the flange which is used to seal against the circumferential wall structure. In this manner there is a significant reduction in bending operations and a reduction in weld seam length which lowers production costs and improves the accuracy of production. If the domes are produced using drawing processes also different shapes are possible. Further the dome structure can be equipped with hinges which allow it be opened as a door to service the interior of the vacuum chamber.

The flat sections of the dome may be further supported by stiffening ribs wherein the number and spacing of ribbing can be adapted to the wall thickness of the dome which may be in the range of 3-12 mm preferably 4-7 mm, where the lower wall thicknesses require a higher number of stiffening ribs than the higher wall thicknesses. At a wall thickness of 12 mm no stiffening ribs are typically required, and at 6 mm wall thickness, normally 6 stiffening ribs are required. Provided stiffening ribs of the flat sections can be attached to a flange section of the dome structure for attachment to the circumferential wall structure to stabilize said flange.

The dome structure can be made of metal, preferably stainless steel. The dome structure can be made of metal, preferably stainless steel, and it may have a wall thickness in the range of 3-8 mm, preferably in the range of 4-7 mm.

The axial cylindrical tubular extension can be made of metal, preferably stainless steel, and wherein it has a wall thickness in the range of 2-5 mm, preferably in the range of 3-5 mm. The vacuum chamber, according to a preferred embodiment, may house in the interior space an adsorber structure in the form of a densely packed array of laterally spaced apart containers comprising a carrier structure with chemical moieties allowing for adsorption of carbon dioxide under ambient atmospheric pressure and temperature and allowing for desorption of the captured carbon dioxide under elevated temperature with respect to ambient atmospheric temperature and/or reduced pressure with respect to ambient atmospheric pressure.

The adsorption structure can be sealed against the inner walls of the vacuum chamber with sealing elements, preferably in the form of profiles affixed on circumferential L profile brackets welded to the inner walls of the vacuum chamber e.g. as shown in FIG. 8a and FIG. 8b. The adsorption structure is pushed against these sealing elements, e.g. in the form of L brackets, during installation into the vacuum chamber, forming a gastight seal and thereby preventing bypass of adsorption air around the adsorption structure. On the opposite side of the adsorption structure L bracket with sealing profiles can be affixed to the inner wall of the vacuum chamber with screws and pushed against the sealing face of the adsorption structure. The sealing profiles can be of a material which is resistant to temperatures between −20° C. and 120° C. and vacuum pressures down to 0 mbar absolute such as EPDM or preferably silicone. This method of sealing can be selected from various solutions and is robust, simple to install, effective and precise and of low cost. Further, through the removable L profiles, the adsorption structure can be accessed and if needed removed/replaced.

An extraction port for the removal of gas and/or water can further be included in the floor section of the circumferential wall. This extraction port can be elevated a certain height d3, typically between 10 and 50 mm, preferably 35 mm above the bottom inner wall of the circumferential section. Thereby a pool of water arising from the condensation of water vapor (stemming from desorption) will form on the base of the vacuum chamber or can also be generated actively before starting. This water pool fills the space between the adsorption structure and the base of the vacuum chamber and seals. In the desorption state, as e.g. illustrated in FIG. 8b, the water pool depth is d3 and equal on both sides of the adsorber structure. Water is progressively extracted at the port as it builds during the desorption process. Under conditions of air flow through the vacuum chamber i.e. during adsorption a shift of the water levels takes place owing to the pressure difference between the upstream and downstream sides of the adsorption structure (FIG. 8a). The difference between the water levels (d1 to d2) corresponds to this pressure difference. On the upstream (i.e. high pressure) side of the adsorption structure, the depth of the water d2 must be higher than h; the radial/vertical spacing between the adsorber structure and the bottom wall and lower than d3, the level of the extraction port above the bottom wall. In this manner the water pool seals the radial space h below the adsorber structure and prevents bypass air flows underneath the adsorber structure. So preferably the adsorber structure is sealed with respect to said circumferential wall structure such that air passing through the vacuum chamber is forced to essentially exclusively pass through the adsorber structure, wherein further preferably the sealing is achieved by profiles attached to the interior side of the circumferential wall structure against which the absorber structure directly or indirectly abuts.

Alternatively or additionally, sealing of the adsorber structure with respect to said circumferential wall structure can at least partly be achieved by providing, in the bottom region of the chamber, at least one elevated extraction port for the removal of water in a floor section of the circumferential wall providing under operation for an elevated water pool level on the floor of the chamber sealing the adsorber structure in the bottom region of the vacuum chamber.

According to a preferred embodiment, the vacuum chamber, i.e. the unit including the circumferential walls, the dome structure and the ribbing as well as optional additional stiffening structures, the circular lid and outlet and inlet channels has a thermal mass per unit volume of the vacuum chamber of less than 250 kJ/K/m3, preferably less than 170 kJ/K/m3. According to yet another preferred embodiment, the pressure drop over the unit in the absence of the absorber structure (1) is less than 100 Pa, preferably less than 30 Pa and the air flow volume per unit volume of the vacuum chamber is in the range of 2000-10,000 m3/h/m3, preferably in the range of 4000-8000 m3/h/m3.

The vacuum chamber may comprise further inlet/outlet elements for attaching at least one vacuum pump and/or for the extraction of gases and/or liquids from the vacuum chamber and/or for the introduction of further process media, in particular water and/or steam and/or wherein it further comprises propulsion elements (such as a fan) for moving air through the vacuum chamber.

A gas distributor may further preferably be integrated onto the inner face of the dome structure in the axial wall. The purpose of this structure is to produce a homogenous distribution of a flushing gas/steam flow in the plenum volume which may be used to support desorption processes while representing as small as possible a flow obstruction as e.g. illustrated in FIG. 2a. The gas distributor preferably consists of a ring of metal tubing, preferably of stainless steel, with a diameter in the range of 16-30 mm connected to the above mentioned inlet and a plurality of holes with diameters 6-12 mm to distribute said gas flow. The gas distributor is preferably integrated into the vacuum chamber on the side of the adsorber structure which is opposite from the vacuum port. In this manner, the flushing gas is pulled through the adsorber structure and homogenously distributed through the adsorber structure.

So according to a preferred embodiment, the vacuum chamber further comprises flushing gas and/or steam introduction elements, preferably in the form of distributor elements on the side of the adsorber structure which is opposite to a gas and/or water extraction port of the vacuum chamber.

The inlet and outlet elements for the delivery of heat transfer liquids can preferably pass through the circumferential wall structure on the side of the vacuum chamber. This allows the unencumbered installation and removal of the axial walls and the adsorption structure. Furthermore the present invention relates to a use of a vacuum chamber as outlined above for a direct carbon dioxide capture process involving cycling between adsorption of carbon dioxide at ambient atmospheric temperatures and pressures and desorption of the carbon dioxide at reduced pressure below ambient atmospheric pressure, preferably at a pressure level of at most 500 $mbar_{abs}$, and at an increased sorbent material temperature of 80-130° C. preferably 90-120° C.

So as concerns the overall characteristics, the following can be summarized:

A vacuum chamber with a substantially rectangular cross section is proposed which comprises two automatically driven lids with a substantially round cross section at two opposite sides that can open at least 20%, preferably in the range of 25-50%, of the cross section area of the vacuum chamber to a gas flow. Such a unit can be used to enable a cyclic adsorption-desorption process for gas separation, preferably a temperature-vacuum swing process for DAC As concerns the vacuum chamber the following can further be summarized:

The inner dimensions of the vacuum chamber are adapted to the dimensions of the adsorber structure so that the void volume excluding void volume of the adsorber structure remains in a desired range of 20-45% preferably 25-35% and can be in the range: Length: 0.6-2.0 m, preferably 1.5 m, width and height, 0.6-2.0 m, preferably 1.5 m. Higher void volumes support a lower pressure drop of flows within the vacuum chamber to the adsorber structure but represent increased pump work during evacuation, greater dilution of desorbate and a larger loss of desorbate upon re-pressurization.

The cross section of the vacuum chamber formed by the circumferential walls can be preferably square. Common vacuum chambers are circular in cross section which requires a round adsorber structure to maintain a void volume in the desired range. Consequently, certain adsorber structures, such as the preferred structure of PCT/EP2014/057185 require elements of varying geometry which increases production and assembly costs. Conversely, a regular adsorber structure with a square cross section produces significant void volume in a vacuum chamber of circular cross section.

The size of the vacuum chambers allows them to be well integrated into standardized 20 ft or 40 ft shipping containers which facilities transport and installation. Depending on the size, between 2 and 12, preferably 3 (20 ft) and 6 (40 ft) vacuum chambers can be integrated into a shipping container. The vacuum chambers can have integrated attachment profiles in their bases which are compatible with forklifts which facilitate their installation and transport. The vacuum chambers can also be attached using these profiles to the carrying structure and/or foundation.

The vacuum chamber can be installed in the aforementioned shipping container in such a manner that the interior of the vacuum chamber is accessible from the service level by opening the dome structure. Such accessibility makes the vacuum chamber easy to clean and maintain in the event of aspiration of foreign matter during adsorption. The dimension A is preferably not larger than 3100 mm such that installation in a standard shipping container is possible. In one possible embodiment, the dimension A is in the range of 2200 to 2400 mm such that the vacuum chamber can be installed in a standard shipping container without disassembling the inlet and outlet channels (4) and (5) thereby simplifying the assembly and delivery.

The unit should be built with materials which are cold-formable, weldable and non-rusting. One possible and generally preferred material is stainless steel 1.4301. Another may be 1.4404 or 1.4307.

The vacuum chamber can withstand pressures down to 1 $mbar_{abs}$, at sorbent material temperatures between 80-130° C. preferably 90-120° C. under flows of high purity CO2 and water vapor and in contact with condensed water.

Because the adsorber structure is not in direct contact with the circumferential wall of the vacuum chamber the wall is allowed to deflect, enabling construction of a rectangular vacuum chamber featuring small wall thickness having a resulting low thermal mass. Wall thickness can be in the range of is 2-8 mm with a stiffening of the walls by means of ribbing elements. Greater wall thicknesses than 4 mm see an increase in thermal mass without a significant saving in ribbing. At a wall thickness not necessarily requiring ribbing i.e. of more than 10 mm, the thermal mass can be very high and potentially prohibitive for DAC applications. Walls of 4 mm thickness also support cold forming bend operations which can be used for the construction of the vacuum chamber, e.g. cold forming operations to produce flanges thereby saving weld operations. A wall thickness of 2 mm may not offer enough stability to adequately seal the chamber whereas a wall thickness higher than 10 mm is difficult to cold form while significantly increasing the thermal mass. The unit has significantly lower wall thickness, thermal mass and consequently production cost than typical rectangular vacuum chambers found in the prior art.

Ribbing elements are used to stiffen the circumferential walls. The form of a '7' moves the maximum amount of material away from the chamber wall to reduce thermal mass and improve stiffness. Other forms can increase T, I and box section although these solutions may increase production costs and complexity. The ribs can be welded to the circumferential walls with recesses to reduce thermal transport into the ribs while maintaining structural stability. Further the space between the ribbing is then well suited to apply insulation which serves to reduce thermal losses to the ambient environment. The transverse section of the ribbing can be placed in the same plane as the transverse face of the terminal flange. Recesses in the ribs can be at 70 mm width with 30 mm weld segment length. Larger recesses may become critical for stability of the ribbing elements due to reduced attachment sections and smaller recesses increase the thermal transport from the chamber wall to the ribbing elements. Density of ribbing elements can be increased with reduced wall thickness. There exists the possibility of joining ribbing elements with a second circumferential wall and thereby reducing wall thickness if wall deflection needs to be tighter controlled. At thinner wall thickness, i.e. 2 mm, it is more effective from point of view of material demand to weld a second circumferential wall of 2 mm material than increase the number of ribbing elements.

The axial wall (dome structure) provides a transition from the square cross section of the vacuum chamber to the round cross section of the inlet and outlet channels. It can be removable to allow access to the adsorber structure. This can be a cold formed part and may be deep drawn. In the cold formed version flat zones in the axial wall are reinforced with stiffening ribs to provide a structural connection to the circumferential walls and terminal flanges of said circumferential wall and of said axial wall, thereby improving stiffness and reducing deformation of the attachment flange in which the O-ring is held and thereby reducing the likelihood of leakage. Axial wall thickness can be in the range of 3-8 mm, preferably in the range of 4-7 mm. An axial wall thickness of 10 mm would require less stiffening ribs, but would be difficult to cold form with an increased thermal mass.

The following can be summarized in relation with the lids:

Circular lids in round inlet and outlet channels which rotate and translate on a drive mechanism between a sealing position in which they provide a vacuum seal on one face and a position in which they are parallel with a gas flow. The lids rotate on an axis on a diameter of the lid.

The range of possible lid diameters for the corresponding vacuum chamber dimensions and dimensions of the circular openings is 0.4-1.5 m or 0.5-1.5 m, preferably 0.75-1.25 m with lid thickness in the range of 5-12 mm. For example, a circular opening of 0.9 mm diameter can be equipped with a 1 m diameter lid with a thickness of 8 mm. At this thickness the drive motor is able to elastically deflect the lid in the closed position enough so that homogenous contact with the o-ring seal over the entire circumference is achieved. In this manner, a consistent seal is achieved and inhomogeneities in lid and/or attachment flange construction can be compensated. At the 1 m size, thinner materials may in some cases not be stable enough to support the vacuum forces while thicker materials are more difficult to deflect by the drive motor in the closed position and may therefore not assure the initial seal to begin evacuation. Alternatively, thicker lid materials may require significantly stronger, larger and more costly drive motors. In the case of thicker and thinner materials than the optimum, the initial seal which allows evacuation may be difficult to produce and maintain. At other lid sizes, there is a different optimum lid thickness which produces the desired elastic deflection. The round form of lids is advantageous over rectangular because the latter may fold or buckle under the necessary elastic deflection which may jeopardize the vacuum seal. Once a vacuum pressure is established in the vacuum chamber the pressure difference across the lid is used as the principle sealing force.

The actuator mechanism converts rotary motion of the drive motor into rotary and linear motion of the lid and is capable of providing sufficient force to elastically deflect the lid to achieve a homogenous and consistent seal with the o-ring which allows the initial evacuation. Very advantageously, the mechanical drive carries part of the load acting on the lid under an evacuated state. In this manner the lid can be built of thinner material which facilitates elastic deflection under the force of the drive motor. For example at 1 m diameter of the lid the mechanical drive carries ⅛-¼ of the vacuum force (total force 7900 kg, force on drive 1500 kg) enabling an optimal material thickness of 8 mm ultimately enabling a tight initial seal to begin evacuation.

The following can be generally summarized in respect of further characteristics:

Inlet and outlet channels are sized to represent lowest possible pressure drop during adsorption and are at least the same diameter as the circular opening. The diameter of inlet and outlet can be in the range of 0.4-1.5 m, or 0.4-1.5 m preferably 0.75-1.25 m for the range of vacuum chamber sizes discussed above. This is a significant difference to prior art adsorption columns with significantly smaller gas inlets and outlets in relation to the column diameter. This solution addresses a specific challenge of DAC wherein very large volume flows of low pressure, low adsorbate concentration air are required for adsorption. Divergent ducting can be used on the inlet and outlet channels to reduce the inlet velocity and the outlet velocity. By reducing the inlet velocity there is lower likelihood of entraining foreign matter (leaves, dust, insects) into the vacuum chamber which is an important factor for a vacuum chamber operating automatically in an ambient atmospheric environment for at least 10,000 adsorption desorption cycles or at least 7 years. In certain configurations the inlet velocity can be lower than 2 m/s. The divergent ducting can have a diameter of up to 2 m at the inlet. At the outlet channel, the reduction of flow velocity allows the recovery of dynamic pressure of the flow and a reduction of fan work thereby saving operation energy. Divergent ducting at the outlet can also have a diameter up to 2 m. The outlet cross section of the divergent outlet ducting and the inlet cross section of the divergent inlet ducting can also have a rectangular cross section.

In order to further avoid the entrainment of foreign matter into the vacuum chamber at least two possible inlet configurations can be used as e.g. shown in the FIGS. 9 and 10 The first consists of a large duct of principally round or square cross section which forms an elbow with an angle at least 60° from the horizontal, preferably at least 75° and forms an extension of the inlet channel with a downward oriented inlet face. Another possibility is the use of a downward sloping air grill mounted on the inlet channel as e.g. shown in FIG. 10 with a spacing of between 1 and 10 cm, preferably 5 cm with grill filaments of thickness less than 1 mm and length between 5 and 15 cm. Both solutions are designed to avoid the entrainment of heavier foreign matter and principally rain while not introducing important increases in pressure drop.

The O-ring is heated at the attachment flange to prevent water accumulations from freezing and jeopardizing the seal against the circular lid. This is a solution to a specific DAC challenge—automatic, cyclic operation in variable ambient atmospheric environments for at least 10,000 h or 7 years— and is not encountered in manually operated lids of vacuum chambers or automatically actuated lids of power generation or ventilation systems.

A gas extraction port can be located near the lid seal.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIGS. 2a-2e show detailed drawings of a vacuum chamber, wherein in 2a) a side section view is given, in 2b) a top section view is given, in 2c) a front view is given, and in 2d) a side section view onto the central portion of the unit (left) and an axial cut through the central portion of the unit (right) is given, and in 2e) a front view of an alternative embodiment is given;

FIGS. 3a-3d show a sequence of the opening of the lid, wherein in driveshaft axial positions 3a) 0% of travel-lid fully open, 3b) 30% of travel, 3c) 50% of travel, 3d) 75% of travel in e) 100% of travel—lid fully closed are given;

FIG. 6 shows the pressure drop against volume air flow of vacuum chamber and adsorber structure for fan 'pushing' and 'pulling' configurations and;

FIG. 7 shows fan pushing (lower) and pulling (upper) configurations;

DESCRIPTION OF PREFERRED EMBODIMENTS

Figure 1:
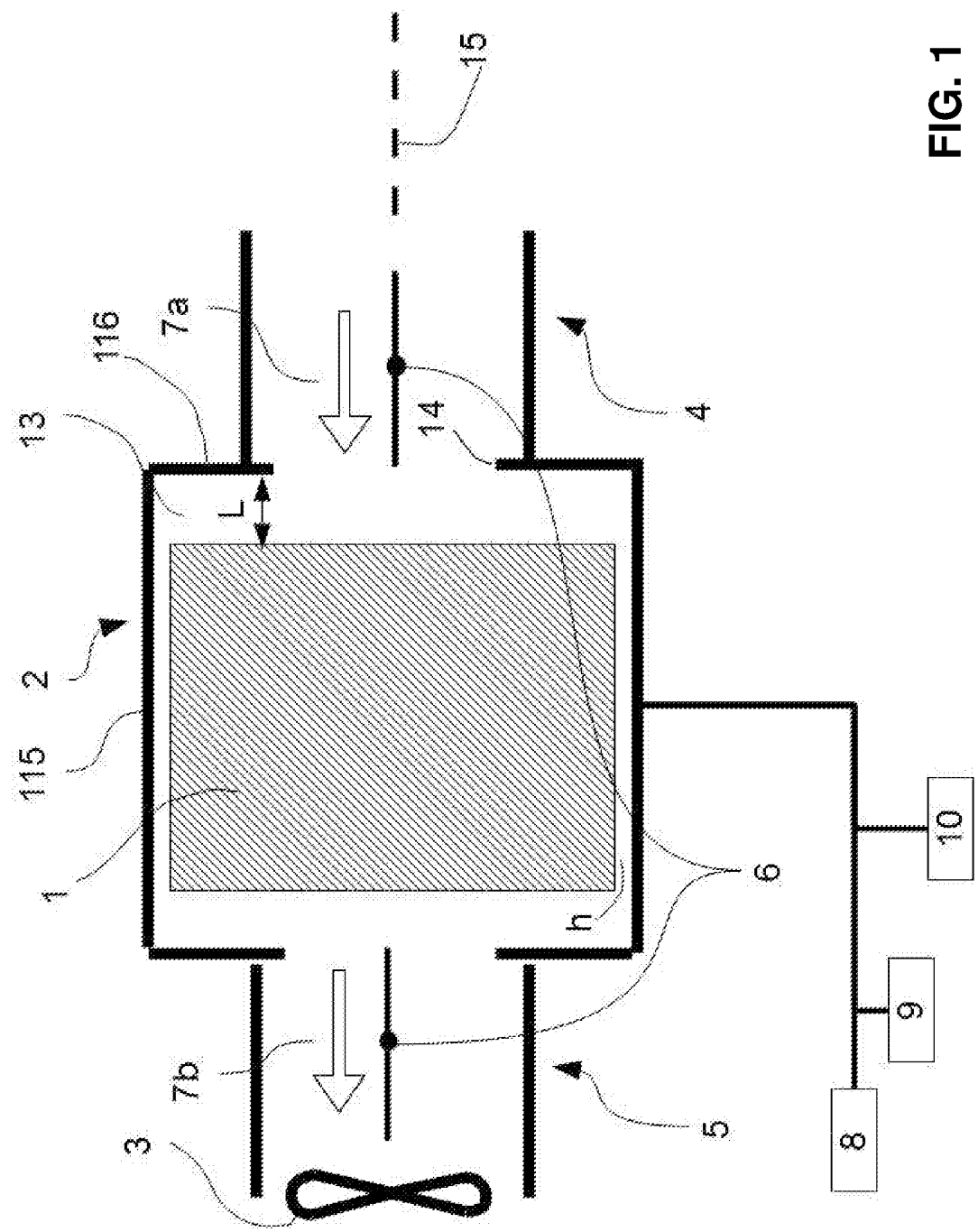
FIG. 1 shows a schematic representation of a vacuum chamber with some key components.

FIGS. 1 through 3 show a vacuum chamber used for direct air capture of CO2, wherein FIG. 1 is a schematic representation, FIG. 2 shows a more detailed drawing representation and FIG. 3 shows the operation of the lid.

FIG. 1 shows a sectional view of a vacuum unit for a DAC process. The vacuum unit in FIG. 1 includes a vacuum chamber 2 with four flat circumferential walls 115 forming a rectangular or square chamber capped off at the axial ends by the axial walls 116 having large circular openings 14 centered on the axis of the vacuum chamber 15. Flat circular lids 6 are housed in the inlet channel 4 and outlet channel 5, respectively. A fan 3 is mounted in the outlet channel 5 in such an orientation that it pulls air through the vacuum chamber and through an adsorber structure 1 located in the interior space 13 of the vacuum chamber 2. An axial spacing L is present between the adsorber structure 1 and the axial wall of the vacuum chamber 116 at the inlet and at the outlet side. A radial spacing h between the adsorber structure 1 and the circumferential wall 115 is present and sealed after mounting of the adsorber structure 1.

For the adsorption stage of a direct air capture process, the lids 6 are placed in the open position in which position their plane coincides with or is parallel to the vacuum chamber axis 15. The fan 3 generates a flow of ambient atmospheric air by pulling air through the vacuum chamber 2 consisting of an adsorption air flow at inlet 7a with a concentration of $CO_2$ commonly found in ambient atmospheric air and an adsorption air flow at outlet 7b with a concentration of $CO_2$ partially or significantly reduced by contacting the air flow with the adsorber structure 1.

For desorption, the fan 3 is shut off thereby stopping the air flow through the vacuum chamber. The circular lids 6 in the inlet channel 4 and outlet channel 5 sides of the vacuum chamber are shifted/rotated to the closed position in which their normal axis is parallel to the vacuum chamber axis 15 and collinear with the axis of the circular openings 14 of the axial walls 116 and the circular lids 6 are in contact with the axial wall 116. Because the diameter of the lids 6 is slightly larger than the circular openings 14 they hereby isolate the interior space of the vacuum chamber 13 from the environment. A vacuum pump for desorption 8 evacuates the vacuum chamber 2 to the desired vacuum pressure. A delivery system for heat transfer fluid 9 delivers hot heat transfer fluid to the adsorber structure 1 thereby raising its temperature. A delivery system for further process media 10 delivers purging gases/liquids if needed. Once desorption is complete, the delivery system for heat transfer fluid 9 delivers cold heat transfer fluid to the adsorber structure 1 thereby lowering its temperature. The vacuum chamber 2 is repressurized to ambient atmospheric pressure and the circular lids 6 are opened to the position where their plane is parallel with the vacuum chamber axis 15. In this state the vacuum chamber 2 is ready for another adsorption.

Figure 2A:
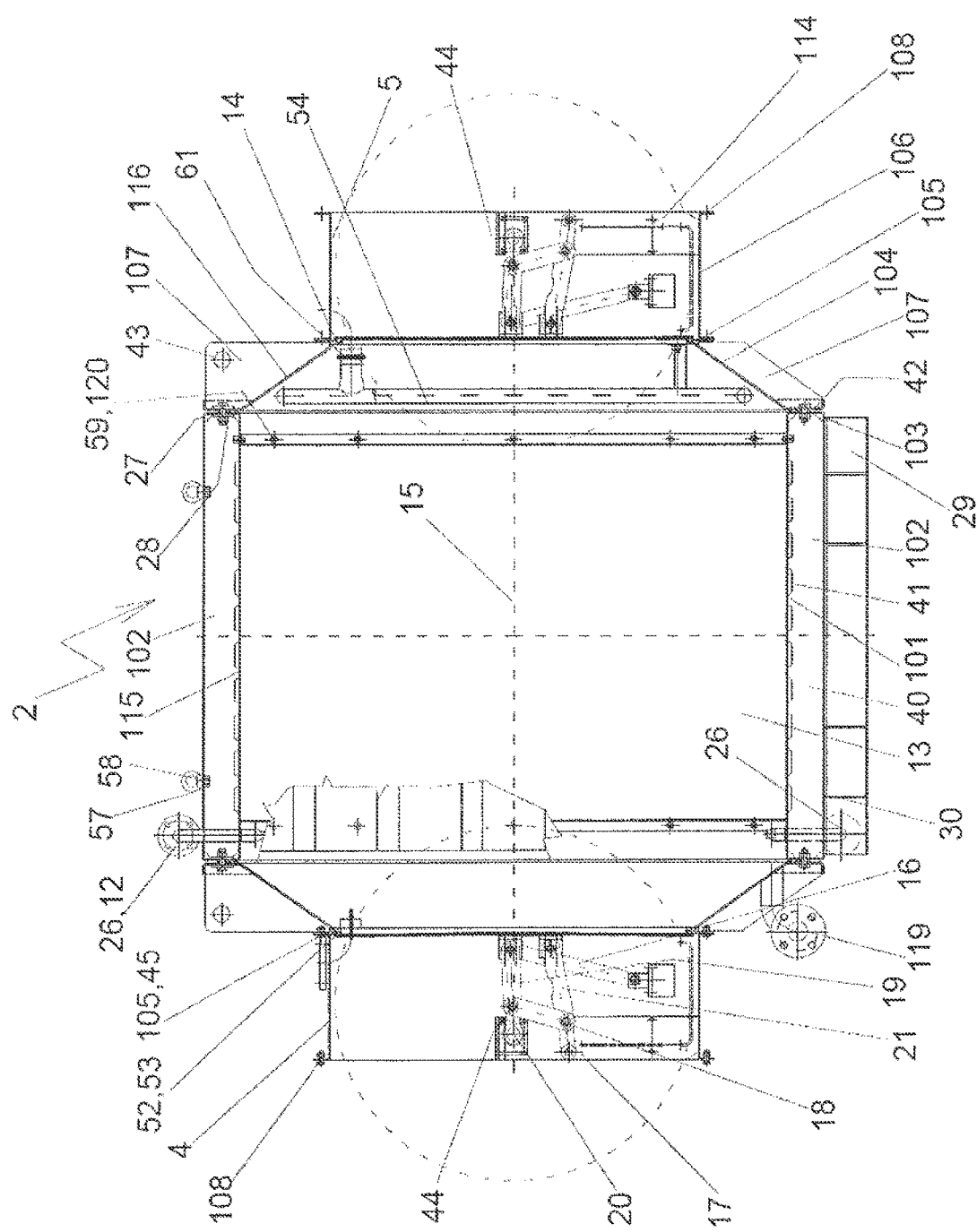

FIG. 2a shows a sectional view of the vacuum chamber 2 from the side. The vacuum chamber in FIG. 2 is formed by flat circumferential wall plates 115 which are welded to one another along the axial edges thereof forming a rectangular or square chamber capped off at the edges with the axial walls 116 having large circular openings 14 and enclosing an interior space 13 of the vacuum chamber 2. A terminal flange 42 of the axial walls 116 is used to affix each of the two axial walls 116 to the respective terminal flange 28 of the circumferential walls 115 at the two ends of the vacuum chamber 2. A sealing gasket 27 provides a vacuum tight seal between these two faces. Both terminal flanges 28 and 42 have additional stiffening flanges 103 which prevent deformation of the terminal flanges 28 and 42 out of a plane perpendicular to the vacuum chamber axis 15. Welded to individual circumferential walls 115 are circular media/instrumentation ports 12 for example for the use of temperature sensors or pressure sensors. On the bottom most circumferential wall 115 are welded attachment profiles 29 and 30 in an orientation such that their length is perpendicular and parallel to the vacuum chamber axis 15 and with which the vacuum chamber can be transported, installed and affixed to a foundation element or a platform.

Ribbing elements 102 are welded onto all four circumferential walls 115 in an orientation parallel to the vacuum chamber axis 15 at attachment sections 101 present between recesses 41 cut into the stiffening section 40 and are also welded to the respective terminal flange 28 of the circumferential walls 115. Further stiffening ribs 107 are welded perpendicular to the surface of the flat sections 104 of the axial walls 116. Some of these stiffening ribs 107 are equipped with holes 43 for servicing and handling with which the vacuum chamber axial walls 116 can be raised or otherwise affixed. In the upper portion of one of the axial walls 116, there can be welded two conical ports which may serve as the heat transfer fluid inlet and outlet 26 through which heat transfer fluid may be delivered to the interior space 13. At the inner edge of the axial wall 116 is welded a circular attachment flange 105, forming or carrying a contact ring 45, with which the inlet 4 and outlet 5 channels, formed by the circumferential cylindrical walls 106 and having a circular terminal flange 108, are affixed to the axial wall 116 such that the axis of the circumferential cylindrical walls 106 is collinear with the vacuum chamber axis 15. In the attachment flange 105 or the contact ring 45, of ⅘ to 116, at a diameter smaller than the circumferential walls 106 and larger than the circular opening 14 and with an axis collinear to the vacuum chamber axis 15 is cut a groove for O-ring 52 in which the O-ring 53 is placed.

Within the circumferential cylindrical walls 106 of the inlet 4 and outlet 5 channels is welded a first vertical support structure 114 in the form of a plate with plane parallel to the vacuum axis 15 and offset from the center of the circumferential cylindrical walls 106 to support the lever assembly 16-21. A second horizontal support structure 44 in the form of a plate with a plane parallel to the vacuum axis 15 and offset from the center of the circumferential cylindrical walls 106 and perpendicular to the first vertical support structure 114 is welded to the circumferential cylindrical walls 106 of the inlet 4 and outlet 5 channels and supports the lever assembly 16-21. The lever assembly comprises 6 interconnected levers which together serve to transform rotary motion into rotary and linear motion: the guide lever 16, the control lever 17, the coupling lever 18, the front lever 19, the drive lever 20 and the tilt lever 21.

A flushing gas/steam inlet port 61 is welded to and passes through the axial wall 116 to deliver gas to the gas distributor 54 within the interior space 13. At the base of the left circumferential wall 115, is welded the gas and water extraction port 119 elevated above the base of the bottom circumferential wall 115. In the faces of the top and bottom circumferential walls 115 are welded two flanged tubing elements forming the heat transfer fluid inlet and outlet 26 through which heat transfer fluid may be delivered to the interior space 13.

On the upper circumferential walls 115 are welded lifting nuts 58 in which lifting eyelets are affixed 57 also for transportation and installation. On the surfaces of the circumferential walls 115, facing the inner volume 13, are welded threaded bushings 59 which are used for the installation of the sealing L profiles with integrated sealing profiles 120.

Figure 2B:
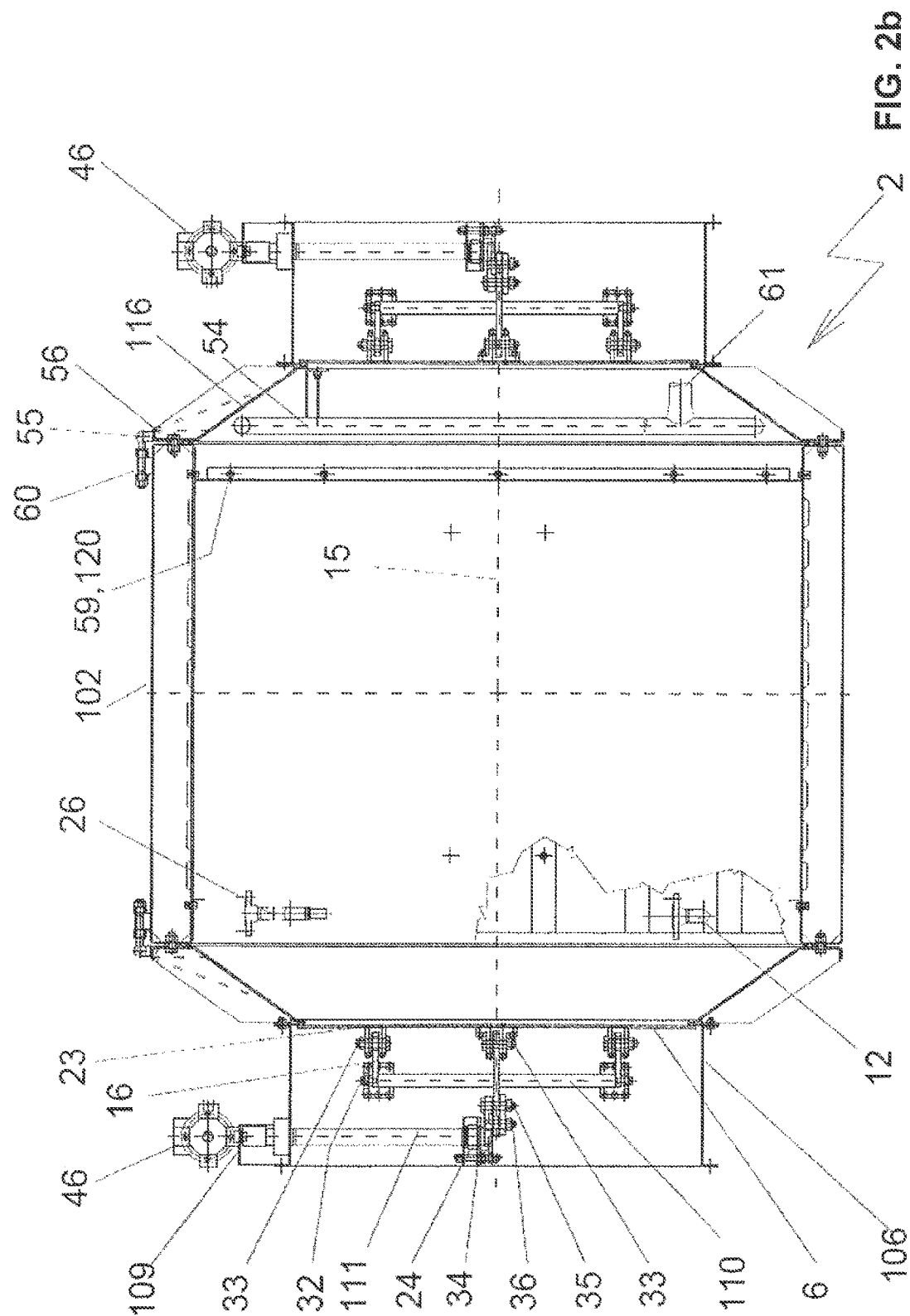

FIG. 2b shows a sectional view of the vacuum chamber 2 from the top. The actuation mechanism of the circular lids 6 is shown on both sides of the vacuum chamber including the drive motor 46 affixed on the mounting structure for drive motor 109 and which produces a rotary motion in the driveshaft 111, the axis of which is perpendicular to the vacuum chamber axis 15 and offset from the circumferential cylindrical walls 106 and is held and moves in the mounting bearing 24 and is moving the actuation mechanism which rotates about the axes 32-36 being the lower rotation axis 32, upper rotation axis 33, third axis, rotation axis 34, coupling rotation axis 35 and the coupling rotation axis 36. The lower transverse rod 110 is positioned parallel to the plane of the circular lid 6 and serves to couple the two attachments 23 of the circular lid 6 to the lever 16.

The hinge body 60 is welded to the external surface of ribbing elements 102 and interfaces with the hinge bracket 56 welded on the axial wall 116 with a hinge pin 55. On the inner surface of the axial wall 116 is affixed the gas distributor 54 supplied through a gas inlet port 61. On the outer face of the upper circumferential wall is welded a flanged heat transfer fluid inlet/outlet 26 and a media/ instrumentation port 12. On the surfaces of the circumferential walls 115, facing the inner volume 13, are welded threaded bushings 59 which are used for the installation of the sealing L profiles with integrated sealing profiles 120.

Figure 2C:
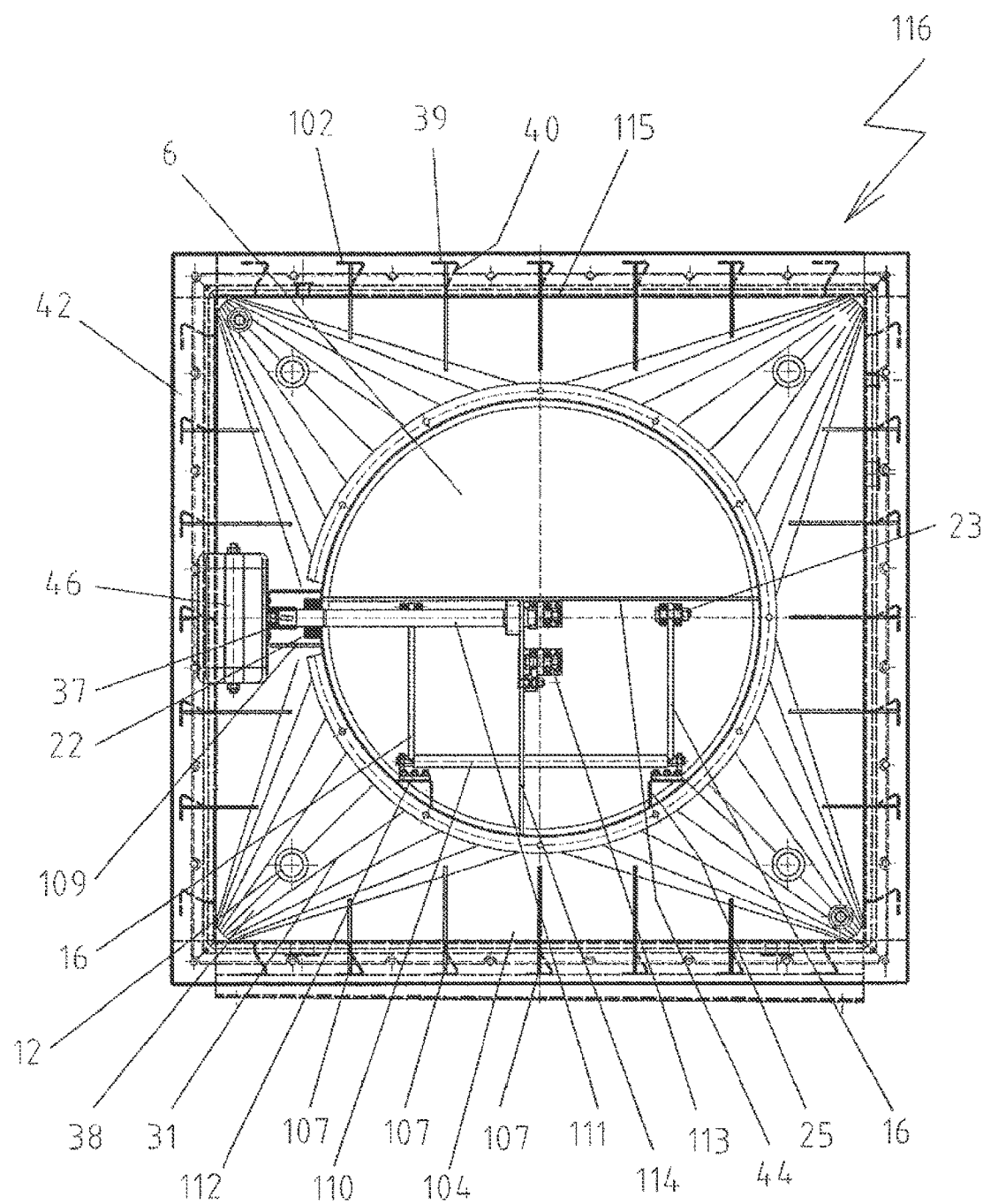

FIG. 2c shows the vacuum chamber 2 from the front with a view parallel to the cross section formed by the circumferential walls 115 with the circular lid 6 in the closed position. Seven ribbing elements 102 in the '7' form comprising a stiffening section 40 and a transverse section 39, the latter being parallel to the surface of circumferential wall 115, are shown welded to each of the four circumferential walls 115. The terminal flange 42 is made by cold forming the metal sheet of the circumferential walls into the form of the flange. The mounting structure for drive motor 109 supports the drive motor 46, the socket 37 which couples said drive motor 46 to the driveshaft 111 which is held in the bearing 22. The first vertical support structure 114 and second horizontal support structure 44 of the driveshaft 111 are shown forming the main load bearing structures of the actuation mechanism.

Further elements of the actuation mechanism are shown such as the two vertical guide levers 16 and the attachment 23 of said guide lever 16 to the circular lid 6. The circular lid is also on a vertical diameter affixed with the flip attachment 113 with which the angle of the circular lid 6 in the closed and open positions can be adjusted. The lower transverse rod 110 is allowed to rotate in the horizontal orientation within bearings affixed in the mounting for bearings 112 themselves affixed in the mounting structure 25 at either end of the lower transverse rod 110. The front surface of the axial wall 116 is composed of 4 curved sections 31 which expand radially from the corner of the axial wall 116 towards the center, themselves composed to 8 flat segments 38 which being all at different angles to one another together approximate a continuous curve and four globally triangular flat sections 104 which are located between the curved sections 31. Stiffening ribs 107 of various lengths and parallel to the main vertical and horizontal axes of the vacuum chamber are welded to the flat sections 104 to improve the stiffness of said sections and of the terminal flange 42. Additional circular media/instrumentation ports 12 can be welded to the curved sections 31.

FIG. 2d shows the interior space 13 formed by 4 circumferential walls 115 which are additionally stiffened each with six ribbing elements 102 in the '7' form comprising a stiffening section 40 and a transverse section 39 the latter being parallel to the surface of circumferential wall 115. Ribbing elements 102 are welded to all circumferential walls 115 in an orientation parallel to the vacuum chamber axis 15 at attachment sections 101 present between recesses 41 cut into the stiffening section 40 and are also welded to the terminal flange 28 of the circumferential walls 115. On the bottom most circumferential wall 115 are welded attachment profiles 29 and 30 in an orientation such that their length is perpendicular and parallel with vacuum chamber axis 15 and with which the vacuum chamber can be transported, installed and affixed to a foundation element or platform.

Figure 2E:
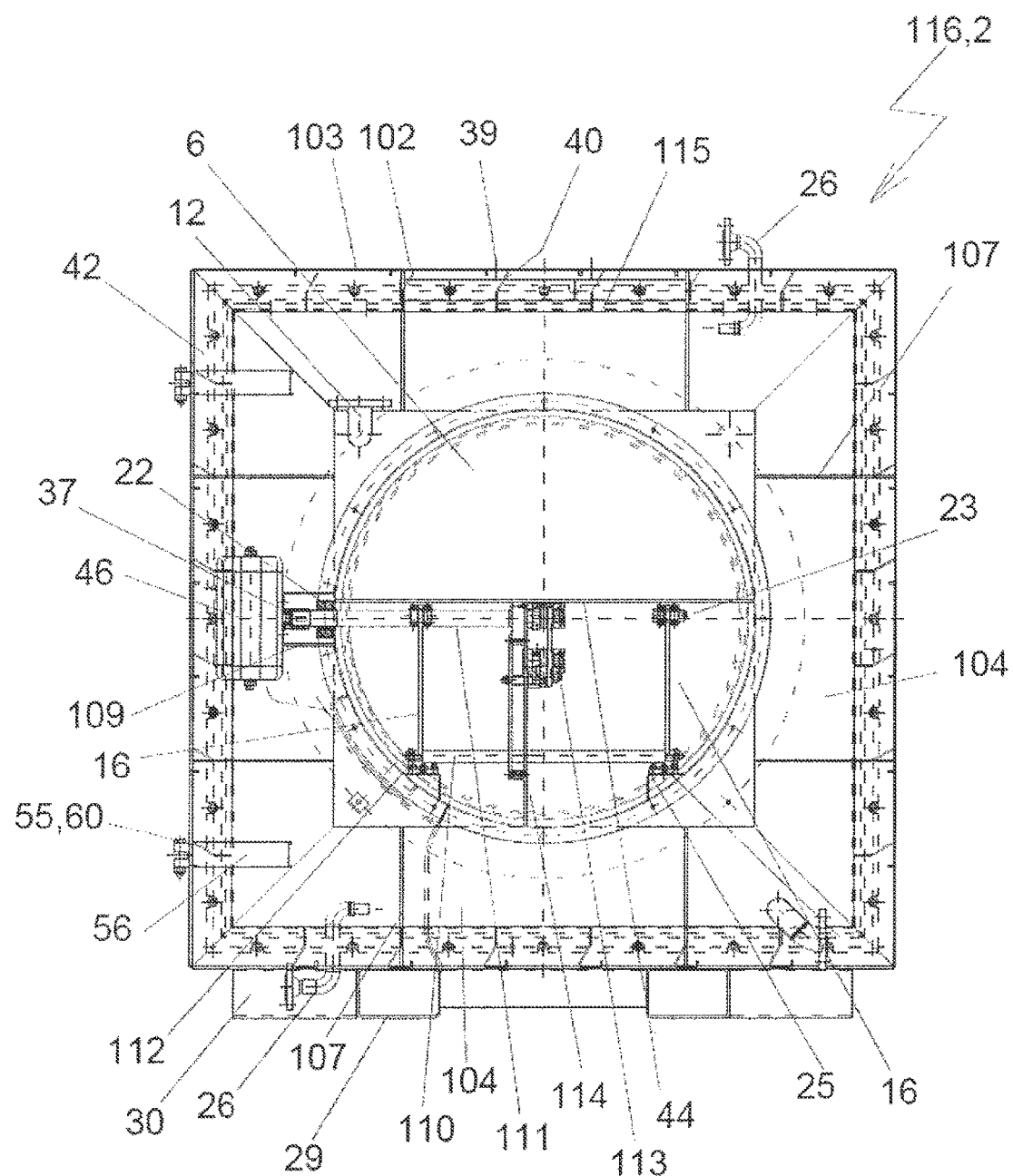

Welded to the upper and lower circumferential walls 115 are the two heat transfer fluid inlet/outlet 26 which pass into the interior volume 13. Into the ribbing elements 102 on the top circumferential wall 115 are integrated by welding lifting nuts 58. Into the ribbing elements 102 of the side circumferential axial walls 115 are welded on one external edge the hinge bodies 60 and in the circumferential axial walls 115 itself threaded bushings 59. FIG. 2e shows a preferred variation of the vacuum chamber 2 from the front with a view parallel to the cross section formed by the circumferential walls 115 with the circular lid 6 in the closed position. Six ribbing elements 102 in the '7' form comprising a stiffening section 40 and a transverse section 39, the latter being parallel to the surface of circumferential wall 115 and coplanar with the stiffening flanges 103 of 115/116, are shown welded to each of the four circumferential walls 115. The terminal flange 42 is made by cold forming the metal sheet of the circumferential walls into the form of the flange. The mounting structure for drive motor 109 supports the drive motor 46, the socket 37 which couples said drive motor 46 to the driveshaft 111 which is held in the bearing 22. The first vertical support structure 114 and second horizontal support structure 44 of the driveshaft 111 are shown forming the main load bearing structures of the actuation mechanism.

Further elements of the actuation mechanism are shown such as the two vertical guide levers 16 and the attachment 23 of said guide lever 16 to the circular lid 6. The circular lid is also on a vertical diameter affixed with the flip attachment 113 with which the angle of the circular lid 6 in the closed and open positions can be adjusted. The lower transverse rod 110 is allowed to rotate in the horizontal orientation within bearings affixed in the mounting for bearings 112 themselves affixed in the mounting structure 25 at either end of the lower transverse rod 110. The front surface of the axial wall 116 is composed of four flat sections 104 welded together along their edges forming a truncated conical prism. Additional media/instrumentation ports 12 can be welded to the flat sections 104. Stiffening ribs 107 of equal lengths and parallel to the main vertical and horizontal axes of the vacuum chamber are welded to the flat sections 104 to improve the stiffness of said sections and of the terminal flange 42. Heat transfer fluid inlet/outlet ports 26 are welded to the bottom and top circumferential walls 115 and pass to the interior 13 of the vacuum chamber 2. Attachment profiles 29 are welded parallel to the vacuum chamber axis 15 to the outer surface of the circumferential wall 115. Further attachment profiles 30 are welded perpendicular to the vacuum chamber axis 15 to the outer surface of the circumferential wall 115. Hinge brackets 56 are welded on one vertical edge of the axial wall 116 and interfaces through a hinge pin 55 to a hinge body 60 affixed to the circumferential walls 115.

FIG. 3a-d shows a cross sectional view from the side with the actuation mechanism of the circular lids 6 at various positions from fully open to fully closed. The percentages indicated represent the percentage of rotary travel of the driveshaft with 0% representing the fully open position. The actuation mechanism comprises a drive lever 20 directly driven via a driveshaft and a motor at its first end about a first axis 48, attached at its second end forming a second axis 49 to a first end of a front lever 19. The second end of the front lever 19 is tiltably, around a tilt axis 51 of the circular lid 6, attached to a portion of the circular lid 6 located essentially on or near the vacuum chamber axis 15. In the position in which the circular lid 6 is closed the drive lever 20 and the front lever 19 are aligned essentially along a straight line parallel to or are collinear with the vacuum chamber axis 15.

A control lever 17 is rotatable about a spatially fixed third axis 34 and with a second end is rotatably attached to a first end of a coupling lever 18 as well as to a first end of a tilt lever 21. The second end of the tilt lever 21 is tiltably attached to the circular lid 6 at a position offset from the attachment of the front lever 19 around a fourth axis 50. The second end of the coupling lever 18 is, with its second end, tiltably attached and rotatable around the second axis 49.

A pair of guide levers 16 is offset towards both sides with respect to drive lever 20, front lever 19, coupling lever 18, control lever 17 and tilt lever 21 and are rotatable around a spatially fixed lower rotation axis 32 with their first end and with their second end being rotatably attached around an upper rotation axis 33 to the circular lid 6, the upper rotation axis 33 and the tilt axis 51 being arranged collinearly.

The coupling lever 18 is with its first end rotatably attached around a coupling rotation axis 35 which couples additionally the front lever 19 and with the second end rotatably attached around a second coupling rotation axis 36 which couples additionally the control lever 17 and the tilt lever 21.

Within the circumferential cylindrical walls 106 of the inlet 4 channel is welded a first vertical support structure 114 in the form of a plate with plane parallel to the vacuum axis 15 and offset from the diameter of the circumferential cylindrical walls 106 to support the actuation mechanism. A second horizontal support structure 44 in the form of a plate with plane parallel to the vacuum axis 15 and offset from the diameter of the circumferential cylindrical walls 106 and perpendicular to the first vertical support structure 114 is welded to the circumferential cylindrical walls 106 of the inlet 4 and channel and supports the actuation mechanism. The mounting structure 25 carries the lower rotation axis and is welded to the circumferential cylindrical walls 106 of the inlet 4 channel. At the inner edge of the axial wall 116 is welded a circular attachment flange 105 with which the inlet 4 channel composed of the circumferential cylindrical walls 106 and having a circular terminal flange 108 is affixed to the axial wall 116 such that the axis of the circumferential cylindrical walls 106 is collinear with the vacuum chamber axis 15.

In the attachment flange 105 of 4 to 116 or in a ring 45 carried thereby, at a diameter smaller than the circumferential walls 106 and larger than the circular opening 14 and with an axis collinear to the vacuum chamber axis 15 is cut a groove for O-ring 52 in which the O-ring 53 is placed.

Stiffening ribs 107 are welded perpendicular to the surface of the flat sections 104 of the axial wall 116 and to the external surface of the terminal flange 42 of the axial wall 116. The terminal flange 42 is made by cold forming the sheet metal of the axial wall 116 into the form of the flange. All elements in FIGS. 1-3 listed above except for the drive motor 46, and O-ring 53 are made of stainless steel 1.4301.

Figure 4:
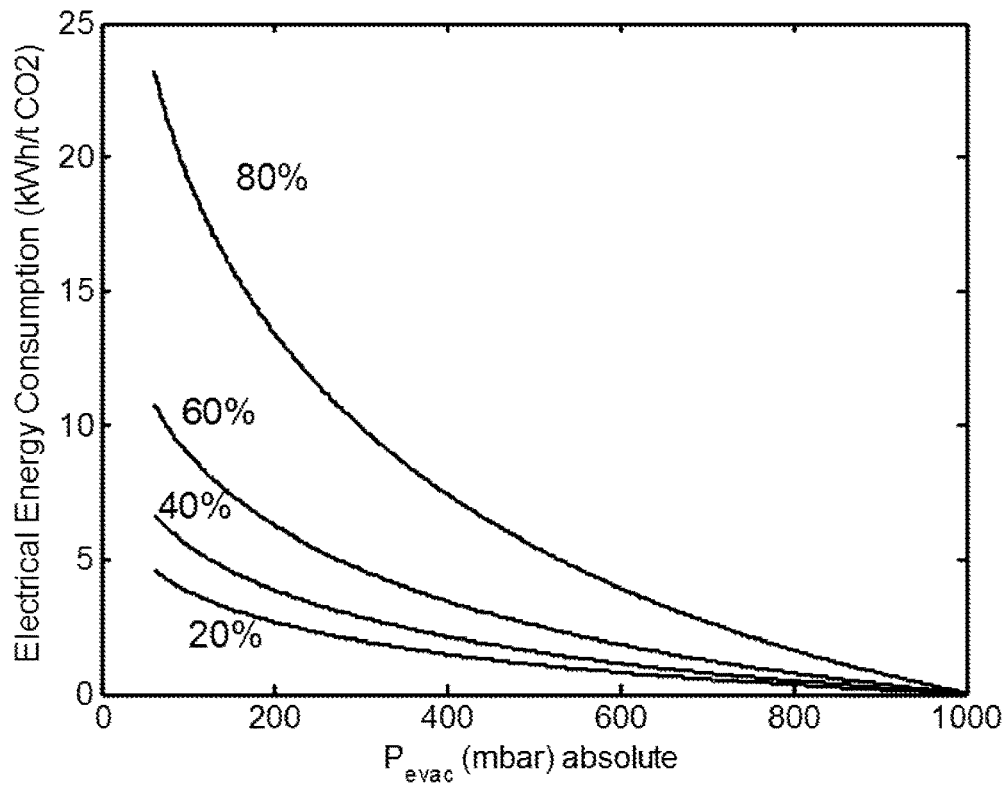
FIG. 4 shows electric energy consumption of vacuum pump in evacuation versus vacuum pressure for various vacuum chamber void volumes.

FIG. 4 shows the results of a numerical investigation of the effect of void volume within the vacuum chamber on vacuum pump energy during evacuation. The electrical energy of evacuation was determined by overlaying the characteristics of a typical fluid ring pump to a theoretical evacuation process beginning at ambient atmospheric pressure and ending at various desorption pressures which are considered attractive for DAC. The dead volume is defined by the 'bulk void ratio' (BVR) which is defined as the ratio of the total void volume in the vacuum chamber with inserted adsorber structure to the total volume in the vacuum chamber when the circular lids 6 are closed.

The vacuum chamber 2 disclosed in this invention has a BVR in the range of 60-65% or 1.8 m$^3$ considering the void volume of the adsorber structure 1. 40% (0.6 m3) of this value stems from the adsorber structure and 60% (1.2 m$^3$) stems from the spacing L and h between the adsorber structure 1 and the circumferential walls 115 and axial walls 116.

FIG. 4 shows the specific energy demand per ton of desorbed CO2 as a function of the final evacuation pressure for various BVRs. It is seen that at vacuum pressures which are attractive for DAC desorption processes utilizing a vacuum swing (50-300 mbar), the electrical energy demand is between 2.5 and 24 kWh/ton CO2 desorbed. Specifically at the lower pressures, the electrical energy is strongly dependent upon the BVR.

Figure 5:
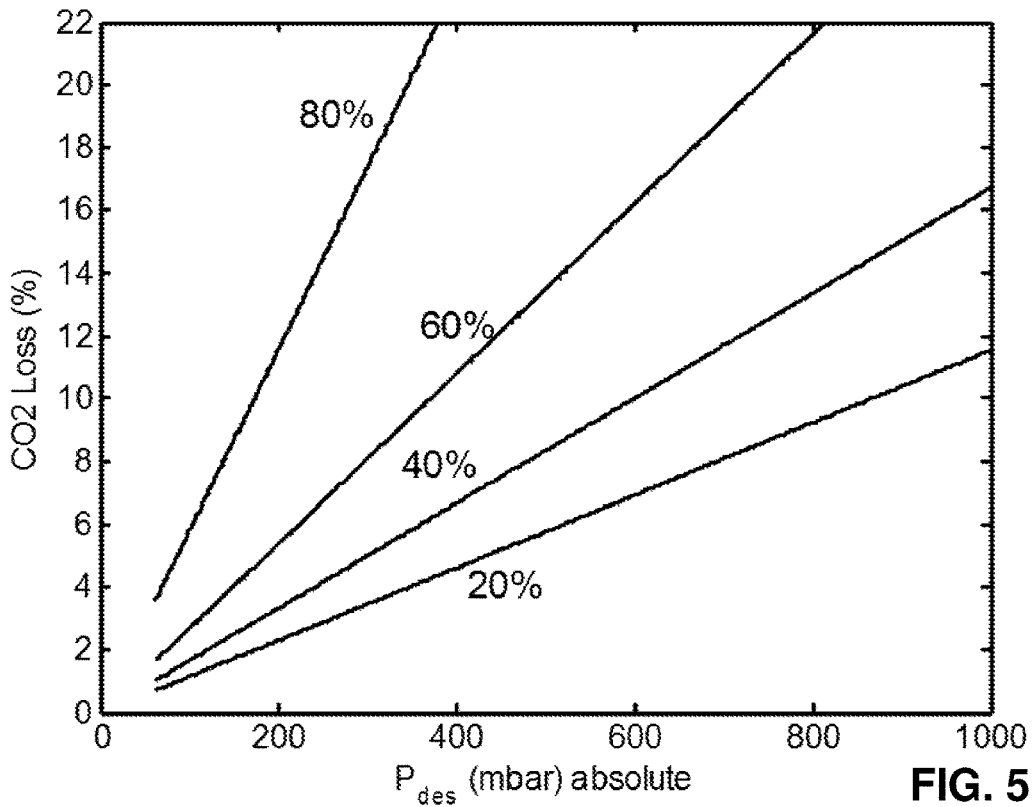
FIG. 5 shows 'loss' of desorbed $CO_2$ versus desorption pressure for various vacuum chamber void volumes.

FIG. 5 shows the results of a numerical investigation of the effect of void volume within the vacuum chamber 2 on desorbate gas ($CO_2$) lost when the unit is repressurized. Higher BVR values lead to a certain amount of desorbed gas which cannot be removed from the vacuum chamber. Upon re-pressurization of the vacuum chamber 2 and the start of the adsorption step, this desorption gas (for example CO2 in DAC processes) is lost.

FIG. 5 shows that at the desorption pressures of interest for DAC applications, BVR values should stay below 60% in order to not lose more than 5% of the desorbed CO2.

FIG. 6 shows the effect of fan 3 orientation on pressure drop through adsorber structure 1. Two configurations were experimentally investigated for a fan 3 moving ambient atmospheric air through an adsorber structure 1 contained in an vacuum chamber 2 similar to the vacuum chamber disclosed in this invention. The configurations C1 and C2 are shown in FIG. 7. A variety of fan 3 powers were investigated leading to a variation in air flow volume and pressure drop. The pressure drop over the adsorber structure and vacuum chamber 2 was measured with a differential pressure sensor 11 and the resulting air flows were measured with a orifice type air flow meter. The results of pressure drop versus volume air flow are shown in FIG. 7. It is seen clearly that configuration C1 has a lower pressure drop and a higher maximum volume air flow than configuration C2. The determining effect is that the turbulences and swirls arising downstream of the fan 3 in configuration C2 are exposed to the adsorber structure 1. In configuration C1 the air entering the adsorber structure 1 does not have directional swirls or turbulences. Thereby a lower pressure drop of the flow is experienced at a higher volume flow. The absolute value of the pressure reduction in configuration C1 versus C2 is of little importance for high pressure flows with high adsorbate concentrations as encountered in devices of the prior however these small difference can represent very significant energy savings for DAC applications using low pressure, low adsorbate concentration flows of ambient atmospheric air.

Figure 8A:
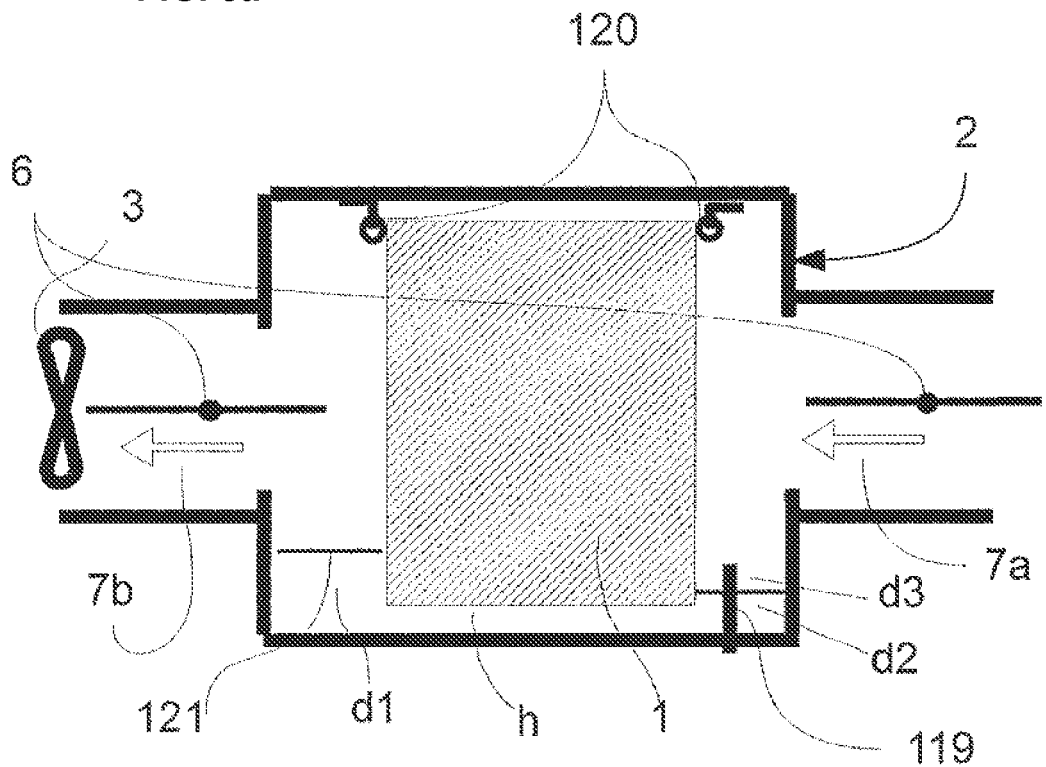
FIGS. 8a-8b show a cross section of the vacuum chamber and adsorption structure showing the L brackets affixed to the vacuum chamber wall sealing against the adsorption structure and 8a) under conditions of air flow with a pool of water at the height d1 and d2 above the inner wall filling the space between the adsorber structure and inner wall and 8b) under condition of no air flow with a pool of water at the height d3 above the inner wall filling the space between the adsorber structure and inner wall.
Figure 8B:
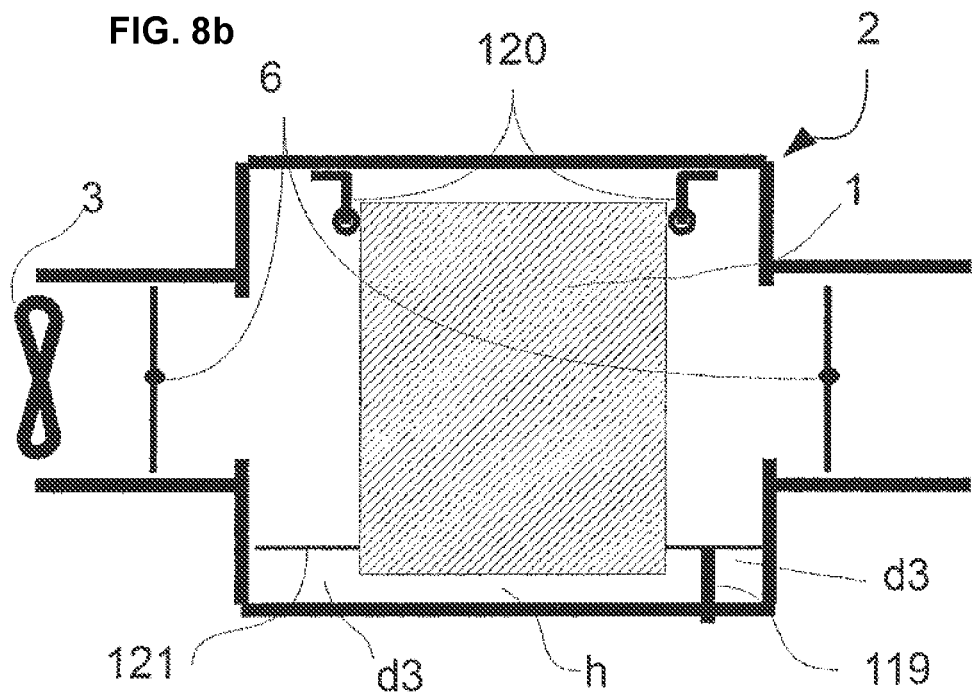

FIG. 8 shows the operation of sealing concepts between the adsorber structure 1 and the inner wall of the vacuum chamber 2. FIG. 8a shows the adsorption air flow at inlet and outlet (7a and 7b respectively) is driven by the fan 3 through the open circular lids 6. To prevent bypass flow, the adsorber structure is held against L profiles with integrated sealing profiles 120 which span the complete circumference of the inner wall of the vacuum chamber 2 on both upstream and downstream sides of the adsorber structure 1. A water pool at the base of the vacuum chamber 121 seals the radial space h between the adsorber structure 1 and the bottom of the inner wall of the vacuum chamber 2. The water pool 121 has a depth of d1 on the downstream side of the adsorber structure 1 and a lower depth of d2 on the upstream side where d2 is greater than h; the radial spacing between adsorber structure 1 and circumferential wall 115. The difference in depths d1 and d2 is substantially proportional to the pressure drop of the adsorber structure 1 at a given air flow rate. An elevated water/gas evacuation port 119 is built into the base of the vacuum chamber 2 with an inlet height d3 above the bottom circumferential wall 115 greater than both h and d2. In FIG. 8*b* the fan 3 is not in operation and the circular lids 6 are closed. The adsorption structure remains held against L profiles with integrated sealing profiles 120 which span the complete circumference of the inner wall of the vacuum chamber 2 on both sides of the adsorber structure 1. The water pool 121 has now a depth of d3 on both sides of the adsorber structure 1 which is higher than h; the radial spacing between adsorber structure 1 and circumferential wall 115 equal to the height of the inlet of the water/gas extraction port 119.

Figure 9:
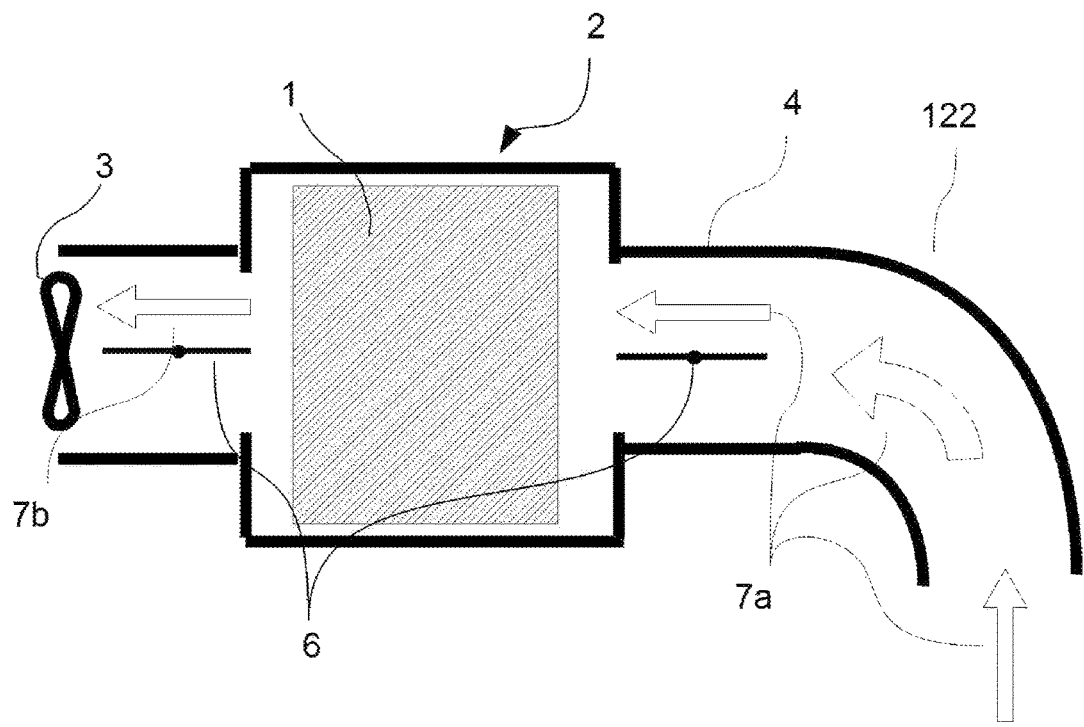
FIG. 9 shows a downward oriented inlet elbow integrated into the vacuum chamber.

FIG. 9 shows the vacuum chamber 2, with the adsorber structure 1 under conditions of adsorption air flow at inlet and outlet (7*a* and 7*b* respectively) driven by the fan 3 through the open circular lids 6. Ambient atmospheric air is aspirated by the fan 3 through a downward oriented elbow duct 122 attached to the inlet channel 4.

Figure 10:
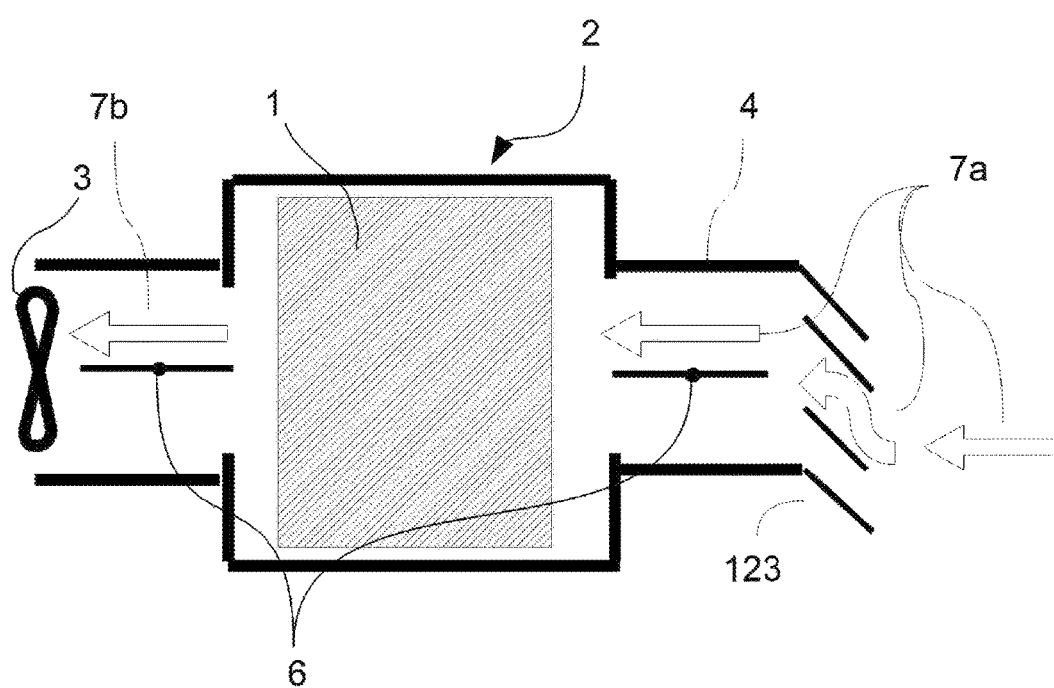
FIG. 10 shows a downward sloping shingled inlet grill integrated into the vacuum chamber.

FIG. 10 shows the vacuum chamber 2, with the adsorber structure 1 under conditions of adsorption air flow at inlet and outlet (7*a* and 7*b* respectively) driven by the fan 3 through the open circular lids 6. Ambient atmospheric air is aspirated by the fan 3 through a downward sloping inlet shingle grill 123 attached to the inlet channel 4.

LIST OF REFERENCE SIGNS

| | |
|---|---|
| 1 | adsorber structure |
| 2 | vacuum chamber |
| 3 | fan |
| 4 | inlet channel |
| 5 | outlet channel |
| 6 | circular lid |
| 7a | adsorption air flow at inlet |
| 7b | adsorption air flow at outlet |
| 8 | vacuum pump for desorption |
| 9 | delivery system for heat transfer fluid (heating/cooling) |
| 10 | delivery system for further process media |
| 11 | differential pressure sensor |
| 12 | media/instrumentation port |
| 13 | interior space of 2 |
| 14 | circular opening in 116 |
| 15 | vacuum chamber axis |
| 16 | guide lever |
| 17 | control lever |
| 18 | coupling lever |
| 19 | front lever |
| 20 | drive lever |
| 21 | tilt lever |
| 22 | bearing of 111 |
| 23 | attachment of 16 to 6 |
| 24 | mounting for bearing of 111 |
| 25 | mounting structure for 110 |
| 26 | heat transfer fluid inlet/oulet |
| 27 | sealing gasket |
| 28 | terminal flange of 115 |
| 29 | attachment profiles |
| 30 | attachment profiles |
| 31 | curved sections of 116 |
| 32 | lower rotation axis of 16 |
| 33 | upper rotation axis of 16 |
| 34 | third axis, rotation axis of 17 |
| 35 | coupling rotation axis between 19 and 20 |
| 36 | coupling rotation axis between 17, 18 and 21 |
| 37 | socket |
| 38 | wedge shaped flat sections of 116 |
| 39 | transverse section of 102 |

-continued

LIST OF REFERENCE SIGNS

| | |
|---|---|
| 40 | stiffening section of 102 |
| 41 | recess of 102 |
| 42 | terminal flange of 116 |
| 43 | hole in 107 for servicing and handling |
| 44 | second horizontal support structure for 111 |
| 46 | drive motor |
| 48 | first axis |
| 49 | second axis |
| 50 | fourth axis |
| 51 | tilt axis of 6 |
| 52 | groove for O-ring in 105 |
| 53 | O-ring |
| 54 | gas distributor |
| 55 | hinge pin |
| 56 | hinge bracket |
| 57 | lifting eyelets |
| 58 | welded nut |
| 59 | threaded bushing |
| 60 | hinge body |
| 61 | gas inlet port |
| 101 | attachment sections of 102 |
| 102 | ribbing element |
| 103 | stiffening flange of 115/116 |
| 104 | flat section of 116 |
| 105 | attachment flange of 4/5 to 116 |
| 106 | circumferential cylindrical wall of 4/5 |
| 107 | stiffening rib |
| 108 | terminal flange of 4/5 |
| 109 | mounting structure for drive motor |
| 110 | lower transverse rod |
| 111 | driveshaft |
| 112 | mounting for bearing of 110 |
| 113 | flip attachment to 6 |
| 114 | first vertical support structure for 111 |
| 115 | circumferential wall |
| 116 | axial wall |
| 119 | elevated gas/water extraction port |
| 120 | L profiles with integrated sealing profiles |
| 121 | water pool at base of vacuum chamber 2 |
| 122 | downward oriented inlet elbow duct |
| 123 | downward sloping inlet shingle grill |
| d1 | depth of water pool downstream side of adsorber structure 1 during adsorption |
| d2 | depth of water pool on upstream side of adsorber structure 1 during adsorption |
| d3 | height of inlet of 119 above 115 |
| L | axial spacing between adsorber structure 1 and axial wall 116 |
| h | radial spacing between adsorber structure 1 and circumferential wall 115 |
| C1 | experimental configuration with fan pulling air through vacuum chamber |
| C2 | experimental configuration with fan pushing air through vacuum chamber |

The invention claimed is:

1. A vacuum chamber for a direct air capture process and enclosing an interior space for housing an adsorber structure comprising a contiguous circumferential wall structure arranged around an axis, which circumferential wall structure in an axial direction is closed by an inlet and an outlet axial wall, respectively, both axial walls comprising at least one circular closing lid allowing for, in an open position, gas to be circulated through the vacuum chamber for contacting the adsorber structure, and in a closed position, to close the interior space and to allow evacuation of the interior space down to a pressure of 500 $mbar_{abs}$, and less, wherein at least one of said axial walls is provided with a circular opening with a contact ring portion, which circular opening can be closed in a gas tight manner by said circular closing lid in the form of a single circular steel lid plate, having a thickness in the range of 4-12 mm and having a diameter in the range of 0.5-1.5 m and larger than said circular opening and in a closed state contacting said contact ring in an axial direction, wherein said contact ring on its axial surface facing said lid plate in closed position, is provided with a full perimeter circular elastic sealing element.

2. The vacuum chamber according to claim 1, wherein the lid is a circular steel plate, with a diameter in the range 0.75-1.25 m, and/or with a thickness in the range of 6-10 mm.

3. The vacuum chamber according to claim 1, wherein the lid is a flap valve actuated with an actuation mechanism located exclusively at the face of the lid opposite to the interior space, wherein in the open position the lid is brought into a position where its plane is aligned and essentially coinciding with said axis.

4. The vacuum chamber according to claim 3, wherein the actuation mechanism comprises a drive lever.

5. The vacuum chamber according to claim 1, wherein the axial walls and the lids in their open state allow for a flow cross-section which is at least 20% of the flow cross-section as defined by the contiguous circumferential wall structure.

6. The vacuum chamber according to claim 1,
wherein said circumferential wall structure has a rectangular or square cross-section and being formed by four planar steel plates with a thickness in the range of 2-8 mm, each with an axial length in the range of 0.6-2.0 m or 0.7-1.8 m, and each with a width in the range of 0.6-1.8 m, and
wherein each steel plate, on its side facing away from the interior space, is provided with a plurality of axially extending ribbing elements, which ribbing elements are attached to the respective steel plate, and
wherein axial walls and the lids in their open state allow for a flow cross-section which is at least 20% of the flow cross-section as defined by the contiguous circumferential wall structure.

7. The vacuum chamber according to claim 6,
wherein the width of the steel plate is in the range of 1.2-1.7 m or in the range of 1.2-1.6 m, and/or
wherein the axial length of the steel plates is in the range of 1.4-1.7 m or in the range of 1.4-1.6 m, and/or
wherein the joints between the respective steel plates are welded seams and/or
wherein the thickness of the steel plates of the circumferential wall structure is in the range of 2-8 mm, or in the range of 3-5 mm, and/or
wherein the steel plates, at their axial edges, are provided with attachment flanges extending radially outwardly, and
wherein the ribbing elements are, with their axial ends, attached to these attachment flanges and/or
wherein the steel plates are stainless steel plates.

8. The vacuum chamber according to claim 6,
wherein every 15-35 cm, measured in a circumferential direction, one ribbing element is arranged on the respective steel plate, and/or
wherein each ribbing element is provided as a pultruded, bent or welded T-profile, L-profile or a 7-profile comprising a stiffening section attached to the respective steel plate.

9. The vacuum chamber according to claim 6,
wherein the ribbing elements are steel profiles with a wall thickness in the range of 1.5-7 mm, and/or
wherein the ribbing elements comprise a stiffening section with recesses separating attachment sections attached to the respective steel plate, said recesses having an axial extension in the range of 30-100 mm, and/or
wherein the ribbing elements comprise a stiffening section with recesses separating attachment sections attached to the respective steel plate, and
wherein a length of said attachment sections is in the range of 10-50 mm.

10. The vacuum chamber according to claim 1,
wherein at least one of the axial walls is provided as a steel dome structure or a stainless steel dome structure, wherein at a circular interface between the dome structure and a cylindrical tubular extension the respective lid seals the vacuum chamber, and/or
wherein the dome structure is constructed of four essentially planar sections which are bent to form ramps and welded together to form a truncated trapezoidal cone, and
wherein the outermost faces of this dome structure simultaneously form the flange used to seal against the circumferential wall structure.

11. The vacuum chamber according to claim 10, wherein the dome structure has a wall thickness in the range of 3-12 mm or 3-8 mm, and wherein an axial cylindrical tubular extension is made of steel or stainless steel, and
wherein it has a wall thickness in the range of 2-5 mm.

12. The vacuum chamber according to claim 1, wherein it comprises an adsorber structure in the form of a densely packed array of laterally spaced apart containers comprising a carrier structure with chemical moieties allowing for adsorption of carbon dioxide under ambient atmospheric pressure and ambient atmospheric temperature and allowing for desorption of the captured carbon dioxide under elevated temperature with respect to ambient atmospheric temperature and/or reduced pressure with respect to ambient atmospheric pressure.

13. The vacuum chamber according to claim 1,
wherein it has a thermal mass per unit volume of the vacuum chamber of less than 250 $kJ/K/m^3$, and/or
wherein the pressure drop over the unit in the absence of the adsorber structure is less than 100 Pa, and/or
wherein the air flow volume per unit volume of the vacuum chamber is in the range of 2000-10,000 $m^3/h/m^3$, and/or
wherein the void volume excluding the internal void volume of the adsorber structure is in a range of 20-45% and/or
wherein the vacuum chamber further comprises flushing gas and/or steam introduction elements.

14. The vacuum chamber according to claim 1,
wherein it comprises further inlet/outlet elements for attaching at least one vacuum pump and/or for the extraction of gases and/or liquids from the vacuum chamber and/or for the introduction of further process media, including water and/or steam and/or
wherein it further comprises propulsion elements for moving air through circular openings of the axial walls and into the vacuum chamber.

15. Use of a vacuum chamber according to claim 1 for a direct carbon dioxide capture process involving cycling between adsorption of carbon dioxide at ambient atmospheric temperature and under ambient atmospheric pressure and desorption of the carbon dioxide at reduced pressure below ambient atmospheric pressure.

16. The vacuum chamber according to claim 1, wherein both of said axial walls is provided with a circular opening with a contact ring portion, which circular opening can be closed in a gas tight manner in each case by a circular closing lid in the form of a single circular stainless steel lid plate, having a thickness in the range of 4-12 mm and having a diameter in the range of 0.5-1.5 m and larger than said circular opening and in a closed state contacting said contact ring in an axial direction, wherein said contact ring on its axial surface facing said lid plate in closed position, is provided with a full perimeter circular elastic sealing element.

17. The vacuum chamber according to claim 1,
wherein the lid is a circular stainless steel plate with a diameter in the range 0.75-1.25 m, and/or with a thickness in the range of 7-10 mm,
wherein the diameter of the lid is a factor 105-145 larger than its thickness, and
wherein the lid is further free from any stiffening element apart from attachment elements for attaching the mechanism and for actuating and controlling the lid.

18. The vacuum chamber according to claim 1, wherein the lid is a flap valve actuated with an actuation mechanism located exclusively at the face of the lid opposite to the interior space, wherein in the open position the lid is brought into a position where its plane is aligned and essentially coinciding with said axis, and wherein the actuation mechanism is a double-lever based actuation mechanism.

19. The vacuum chamber according to claim 3, wherein the actuation mechanism comprises a drive lever, driven via a driveshaft at its first end about a first axis by a motor, attached at its second end forming a second axis to a first end of a front lever, wherein the second end of said front lever is tiltably, around a tilt axis of the lid, attached to a portion of the lid located essentially on or near said axis, and wherein in the position in which the lid is closed the drive lever and the front lever are aligned essentially along a straight line parallel or are essentially collinear with said axis.

20. The vacuum chamber according to claim 3, wherein there is provided a control lever which with a first end is rotatable about a spatially fixed third axis and with a second end is rotatably attached to a first end of a coupling lever as well as to a first end of a tilt lever, wherein the second end of said tilt lever is tiltably attached to the lid at a position offset from the attachment of the front lever around a fourth axis, and wherein the second end of said coupling lever is, with its second end, tiltably attached and rotatable around said second axis.

21. The vacuum chamber according to claim 20, wherein the first, second, third and fourth axes are all arranged parallel and all of them orthogonal to the axis of the vacuum chamber.

22. The vacuum chamber according to claim 3, wherein the actuation mechanism comprises:
a drive lever, driven via a driveshaft at its first end about a first axis by a motor, attached at its second end forming a second axis to a first end of a front lever,
wherein the second end of said front lever is tiltably, around a tilt axis of the lid, attached to a portion of the lid located essentially on or near said axis,
wherein in the position in which the lid is closed the drive lever and the front lever are aligned essentially along a straight line parallel or are essentially collinear with said axis,
wherein there is provided a control lever which with a first end is rotatable about a spatially fixed third axis and with a second end is rotatably attached to a first end of a coupling lever as well as to a first end of a tilt lever,
wherein the second end of said tilt lever is tiltably attached to the lid at a position offset from the attachment of the front lever around a fourth axis,
wherein the second end of said coupling lever is, with its second end, tiltably attached and rotatable around said second axis, and
wherein there is provided a pair of guide levers, offset towards both sides with respect to an arrangement of said central arrangement drive lever, front lever, coupling lever, control lever and tilt lever,
wherein said guide levers are rotatable around a spatially fixed lower rotation axis with their first end and with their second end are rotatably attached around an upper rotation axis to the lid, and
wherein the upper rotation axis and the tilt axis are arranged collinearly.

23. The vacuum chamber according to claim 1, wherein the axial walls and the lids in their open state allow for a flow cross-section which is in the range of 25-50%, of the flow cross-section as defined by the contiguous circumferential wall structure.

24. The vacuum chamber according to claim 5, wherein the circumferential wall structure has a rectangular or square cross-section and is formed by four planar stainless steel plates, with a thickness in the range of 2-8 mm, each with an axial length in the range of 0.6-2.0 m or 0.7-1.8 m, and each with a width in the range of 0.6-1.8 m, and
wherein each steel plate, on its side facing away from the interior space, is provided with a plurality of axially extending ribbing elements, which ribbing elements are attached to the respective steel plate, section and/or point wise,
wherein the axial walls and the lids in their open state allow for a flow cross-section which is in the range of 25-50%, of the flow cross-section as defined by the contiguous circumferential wall structure.

25. The vacuum chamber according to claim 24, wherein the plurality of attachment sections are separated by a plurality of recesses of the ribbing elements, where there is no contact between the ribbing elements and the respective steel plate
or wherein the circumferential wall structure has a circular cross-section and is formed by one single or a sequence of curved steel plates, with a thickness in the range of 2-8 mm, with an axial length in the range of 0.7-1.8 m.

26. The vacuum chamber according to claim 6, wherein the width of the steel plates is in the range of 1.2-1.6 m,
and/or wherein the axial length of the steel plates is in the range of 1.4-1.6 m, and/or
wherein the joints between the respective steel plates are welded seams and/or
wherein the thickness of the steel plates of the circumferential wall structure is in the range of 3-5 mm, and/or
wherein the steel plates, at their axial edges, are provided with attachment flanges extending radially outwardly, and
wherein the ribbing elements are, with their axial ends, attached to these attachment flanges, by welding seams.

27. The vacuum chamber according to claim 6, wherein every 20-30 cm, measured in a circumferential direction, one ribbing element is arranged on the respective steel plate, wherein the ribbing elements on a respective steel plate are essentially equally distributed along the circumference, and/or wherein each ribbing element is provided as a pultruded, bent or welded T-profile, L-profile or a 7-profile comprising a stiffening section attached to the respective steel plate, in case of recesses via attachment sections, at one lateral edge and at the opposite lateral edge attached to or adjoining to a transverse section, wherein the radial height of the stiffening section in a radial direction is in the range of 4-15 cm, or in the range of 5-7 cm, and wherein the circumferential width of the transverse section is in the range of 2-10 cm, or in the range of 3-7 cm.

28. The vacuum chamber according to claim 6, wherein the ribbing elements are steel profiles with a wall thickness in the range of 2-5 mm, and/or wherein the ribbing elements comprise a stiffening section with recesses separating attachment sections attached to the respective steel plate, said recesses having an axial extension of the recesses is in the range of 50-80 mm and/or wherein the ribbing elements are stainless steel profiles, and/or wherein the ribbing elements comprise a stiffening section with recesses separating attachment sections attached to the respective steel plate, wherein the length of said attachment sections is in the range of 20-40 mm, and wherein this length is equal to the weld seam length of the attachment to the respective steel plate or stainless steel plate.

29. The vacuum chamber according to claim 1, wherein at least one of the axial walls is provided as a steel dome structure, with an axial cylindrical tubular extension forming an inlet or outlet channel, respectively, wherein at the circular interface between the dome structure and the cylindrical tubular extension the respective lid seals, at a contact ring, the vacuum chamber, and/or wherein the dome structure comprises flat sections at straight edges of the respective steel plates, wherein in the region of the flat sections there is further provided one or a multitude of exterior stiffening ribs attached to the flat sections and to a flange section of the dome structure for attachment to the circumferential wall structure, and wherein further the dome structure comprises curved sections converging towards the edges formed between adjacent steel plates or stainless steel plates, wherein said curved sections can be formed by deep drawing or by a plurality of individual, essentially wedge-shaped flat sections sequentially tilted with respect to each other and/or wherein the dome structure is constructed of four essentially planar sections which are bent to form ramps and welded together to form a truncated trapezoidal cone, wherein the outermost faces of this dome structure simultaneously form the flange used to seal against the circumferential wall structure.

30. The vacuum chamber according to claim 10, wherein the dome structure has a wall thickness in the range of 4-7 mm, and wherein the axial cylindrical tubular extension is made of steel or stainless steel, and wherein it has a wall thickness in the range of 3-5 mm.

31. The vacuum chamber according to claim 1, wherein it comprises an adsorber structure in the form of a densely packed array of laterally spaced apart containers comprising a carrier structure with chemical moieties allowing for adsorption of carbon dioxide under ambient atmospheric pressure and ambient atmospheric temperature and allowing for desorption of the captured carbon dioxide under elevated temperature with respect to ambient atmospheric temperature and/or reduced pressure with respect to ambient atmospheric pressure and wherein the adsorber structure is sealed with respect to said circumferential wall structure such that air passing through the vacuum chamber is forced to essentially exclusively pass through the adsorber structure, and wherein the sealing is achieved by profiles attached to the interior side of the circumferential wall structure against which the adsorber structure directly or indirectly abuts and/or is at least partly achieved by providing, in the bottom region of the chamber, at least one elevated extraction port for the removal of water in a floor section of the circumferential wall providing under operation for an elevated water pool level on the floor of the chamber sealing the adsorber structure in the bottom region of the vacuum chamber.

32. The vacuum chamber according to claim 1, wherein it has a thermal mass per unit volume of the vacuum chamber of less than 170 kJ/K/m$^3$, and/or wherein the pressure drop over the unit in the absence of the adsorber structure is less than 30 Pa, and/or wherein the air flow volume per unit volume of the vacuum chamber is in the range of 4000-8000 m$^3$/h/m$^3$, and/or wherein the void volume excluding the internal void volume of the adsorber structure is in a range of 25-35%, and/or wherein the vacuum chamber further comprises flushing gas and/or steam introduction elements, in the form of distributor elements on the side of the adsorber structure which is opposite to a gas and/or water extraction port of the vacuum chamber.

33. The vacuum chamber according to claim 1, wherein it comprises further inlet/outlet elements for attaching at least one vacuum pump and/or for the extraction of gases and/or liquids from the vacuum chamber and/or for the introduction of further process media, including water and/or steam and/or wherein it further comprises propulsion elements for moving air through circular openings of the axial walls and into the vacuum chamber, wherein at each axial end on both sides of the adsorber structure a connection for attaching a vacuum is provided, and/or wherein air propulsion elements are provided such that they pull air through the vacuum chamber.

34. Use according to claim 15 for a direct carbon dioxide capture process involving cycling between adsorption of carbon dioxide at ambient atmospheric temperature and under ambient atmospheric pressure and desorption of the carbon dioxide at reduced pressure below ambient atmospheric pressure, at a pressure level of at most 500 mbar$_{abs}$, and/or at an increased sorbent material temperature of 90-120° C.

* * * * *